US010828649B2

(12) United States Patent
Conrad

(10) Patent No.: US 10,828,649 B2
(45) Date of Patent: Nov. 10, 2020

(54) CYCLONIC AIR TREATMENT MEMBER AND SURFACE CLEANING APPARATUS INCLUDING THE SAME

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 156 days.

(21) Appl. No.: 16/254,918

(22) Filed: Jan. 23, 2019

(65) Prior Publication Data

US 2020/0230617 A1 Jul. 23, 2020

(51) Int. Cl.

*B01D 50/00* (2006.01)
*B04C 5/08* (2006.01)
*B04C 5/187* (2006.01)
*B04C 9/00* (2006.01)
*A47L 9/16* (2006.01)
(Continued)

(52) U.S. Cl.

CPC .............. *B04C 5/08* (2013.01); *A47L 9/1608* (2013.01); *A47L 9/1691* (2013.01); *B04C 5/187* (2013.01); *B04C 9/00* (2013.01); *A47L 5/225* (2013.01); *A47L 5/24* (2013.01); *A47L 9/1683* (2013.01);
(Continued)

(58) Field of Classification Search

CPC .. B04C 5/08; B04C 5/187; B04C 9/00; B04C 2009/005; B04C 2009/004; A47L 9/1691; A47L 9/1608; A47L 5/24; A47L 9/1683; A47L 9/165; A47L 5/225
See application file for complete search history.

(56) References Cited

U.S. PATENT DOCUMENTS 750,769 A 1/1904 Jackson
6,406,505 B1 6/2002 Oh et al.
(Continued)

FOREIGN PATENT DOCUMENTS

GB 2370006 B 10/2003

OTHER PUBLICATIONS

"Lupe Cordless Vacuum Cleaner. Powerful. Enduring. Flexible." retrieved at https://www.kickstarter.com/projects/lupepablo/lupe-cordless-vacuum-cleaner-powerful-enduring-flexible; published at least as early as Jun. 18, 2019.
(Continued)

*Primary Examiner* — Dung H Bui
(74) *Attorney, Agent, or Firm* — Philip C. Mendes da Costa; Bereskin & Parr LLP/S.E.N.C.R.L., s.r.l.

(57) ABSTRACT

A surface cleaning apparatus includes an air flow path, a cyclone bin assembly, and a suction motor. The air flow path extends from a dirty air inlet to a clean air outlet. The cyclone bin assembly is provided in the air flow path, and includes a cyclone chamber, a cyclone air inlet, a cyclone air outlet, a cyclone axis of rotation, and an axially extending cyclone chamber sidewall extending between first and second axially opposed ends. The cyclone chamber sidewall has first portion that is moveably mounted with respect to a second portion of the cyclone chamber sidewall between a closed position in which the first and second portions meet at a first juncture and a second juncture and an open position in which the cyclone chamber is opened. The first juncture extends at an angle to a plane that is transverse to the cyclone axis of rotation.

20 Claims, 30 Drawing Sheets

(51) Int. Cl.
*A47L 5/22* (2006.01)
*A47L 5/24* (2006.01)

(52) U.S. Cl.
CPC .. *B04C 2009/004* (2013.01); *B04C 2009/005* (2013.01)

(56) References Cited

U.S. PATENT DOCUMENTS

| | | | | |
|---|---|---|---|---|
| 6,782,583 | B2 * | 8/2004 | Oh | A47L 9/104 15/350 |
| 7,803,207 | B2 | 9/2010 | Conrad | |
| 7,882,593 | B2 | 2/2011 | Beskow et al. | |
| 7,922,794 | B2 | 4/2011 | Morphey | |
| 7,958,597 | B2 | 6/2011 | Frantzen et al. | |
| 8,069,529 | B2 | 12/2011 | Groff et al. | |
| 8,156,609 | B2 | 4/2012 | Milne et al. | |
| 8,236,077 | B2 | 8/2012 | Gomiciaga-Pereda et al. | |
| 8,424,154 | B2 | 4/2013 | Beskow et al. | |
| 8,549,704 | B2 | 10/2013 | Milligan et al. | |
| 8,567,008 | B2 | 10/2013 | Conrad | |
| 8,607,406 | B2 | 12/2013 | Miefalk et al. | |
| 8,607,407 | B2 | 12/2013 | Conrad | |
| 8,640,304 | B2 | 2/2014 | Conrad | |
| 8,769,764 | B2 | 7/2014 | Crouch et al. | |
| 9,009,912 | B2 | 4/2015 | Conrad | |
| 9,027,198 | B2 | 5/2015 | Conrad | |
| 10,327,612 | B2 * | 6/2019 | Conrad | A47L 9/0613 |
| 10,729,296 | B2 * | 8/2020 | Kah, Jr. | A47L 9/2857 |
| 2003/0037406 | A1 * | 2/2003 | Wright | B01D 46/2411 15/353 |
| 2006/0090290 | A1 | 5/2006 | Lau | |
| 2006/0101611 | A1 * | 5/2006 | Oh | A47L 9/1691 15/353 |
| 2006/0230715 | A1 * | 10/2006 | Oh | B01D 45/14 55/337 |
| 2011/0289720 | A1 | 12/2011 | Han et al. | |
| 2014/0216333 | A1 * | 8/2014 | Hoversten | B04C 3/06 118/308 |
| 2014/0366310 | A1 | 12/2014 | Conrad | |
| 2017/0303758 | A1 * | 10/2017 | Conrad | A47L 9/1641 |
| 2018/0303301 | A1 * | 10/2018 | Conrad | B01D 45/08 |
| 2018/0368639 | A1 * | 12/2018 | Peters | A47L 9/165 |
| 2018/0368640 | A1 * | 12/2018 | Griffiths | B04C 5/185 |
| 2019/0082925 | A1 * | 3/2019 | Conrad | A47L 5/36 |
| 2019/0133389 | A1 * | 5/2019 | Nam | A47L 9/2857 |
| 2020/0196814 | A1 * | 6/2020 | Grebing | A47L 9/1608 |

OTHER PUBLICATIONS

International Search Report and Written Opinion, received in connection to international patent application No. PCT/CA2020/050054, dated Apr. 8, 2020.

* cited by examiner

CYCLONIC AIR TREATMENT MEMBER AND SURFACE CLEANING APPARATUS INCLUDING THE SAME

FIELD

This application relates to the field of cyclonic air treatment members and surface cleaning apparatus including the same.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners, including battery operated cyclonic hand vacuum cleaners, are known in the art.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one aspect, a cyclone assembly is provided wherein one or more portions of the sidewall of the cyclone chamber is moveable with respect to another portion of the cyclone sidewall (from a closed position to an open position) so as to open the sidewall and provide a wider opening at an end (e.g., a lower end) of the cyclone chamber. The wider opening assists a user in emptying the cyclone chamber. For example, if a hairball is formed in the cyclone chamber, a wider opening may allow the hairball to fall out of the cyclone chamber when the cyclone chamber sidewall is in the open position.

It will be appreciated that the sidewall may open along a plane that extends generally parallel to the axis of rotation of the cyclone chamber. Accordingly, a first sidewall portion and a second sidewall portion may meet at a juncture that extends generally axially. The juncture may extend along the entire length of the cyclone chamber or only part way from one axial end of the cyclone chamber part way towards another axial end of the cyclone chamber.

The cyclone chamber may also have an openable end wall at, e.g., the lower end of the cyclone chamber. The openable end wall may be openable concurrently with opening the sidewall or independently of opening the sidewall (e.g., prior to opening the sidewall or subsequently to opening the sidewall).

In accordance with this aspect, there is provided a surface cleaning apparatus comprising:

(a) an air flow path extending from a dirty air inlet to a clean air outlet;

(b) a cyclone bin assembly provided in the air flow path, the cyclone bin assembly comprising a cyclone chamber, a cyclone air inlet, a cyclone air outlet, a cyclone axis of rotation, an axially extending cyclone chamber sidewall extending between first and second axially opposed ends; and, (c) a suction motor provided in the air flow path, wherein the cyclone chamber sidewall has first portion that is moveably mounted with respect to a second portion of the cyclone chamber sidewall between a closed position in which the first and second portions meet at a first juncture and a second juncture and an open position in which the cyclone chamber is opened, and wherein the first juncture extends at an angle to a plane that is transverse to the cyclone axis of rotation.

The first juncture may extend generally axially.

The first portion may be pivotally mounted to the surface cleaning apparatus about a pivot axis and the pivot axis may extend through the cyclone chamber.

The cyclone air outlet may be provided at the first opposed end and the second opposed end may comprise an end wall that is moveable with the first portion.

The cyclone air outlet may comprise a screen and the screen may be moveably mounted with respect to one of the sidewall portions. Optionally, the screen may be pivotally mounted to one of the sidewall portions. Alternately, or in addition, the screen may be removable after the first portion is moved to the open position.

The cyclone air outlet may be provided at the first opposed end, the cyclone air outlet may comprise a screen, the second opposed end may comprise an end wall and the surface cleaning apparatus may further comprise a generally axially extending member provided in the cyclone chamber at the opposed end.

The cyclone air outlet may be provided at the first opposed end and the second opposed end may comprise an end wall that is moveable mounted with respect to the first and second portions. Optionally, the end wall may be pivotally mounted to one of the first and second portions.

The first portion may be pivotally mounted to the surface cleaning apparatus about a pivot axis and the pivot axis may extend generally axially.

The pivot axis may be positioned external to the cyclone chamber. For example, the pivot axis may comprise a piano hinge. Accordingly, the pivot axis may be aligned with the cyclone axis of rotation.

The pivot axis may extend through the cyclone chamber and each of the first and second portions may comprise an axial cylindrical segment. Accordingly, the first juncture may extend generally axially.

The second juncture may extend generally parallel to the first juncture and may be angularly spaced around the cyclone chamber from the first juncture, whereby the first portion is axially translatable with respect to the second portion.

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Figure 1:
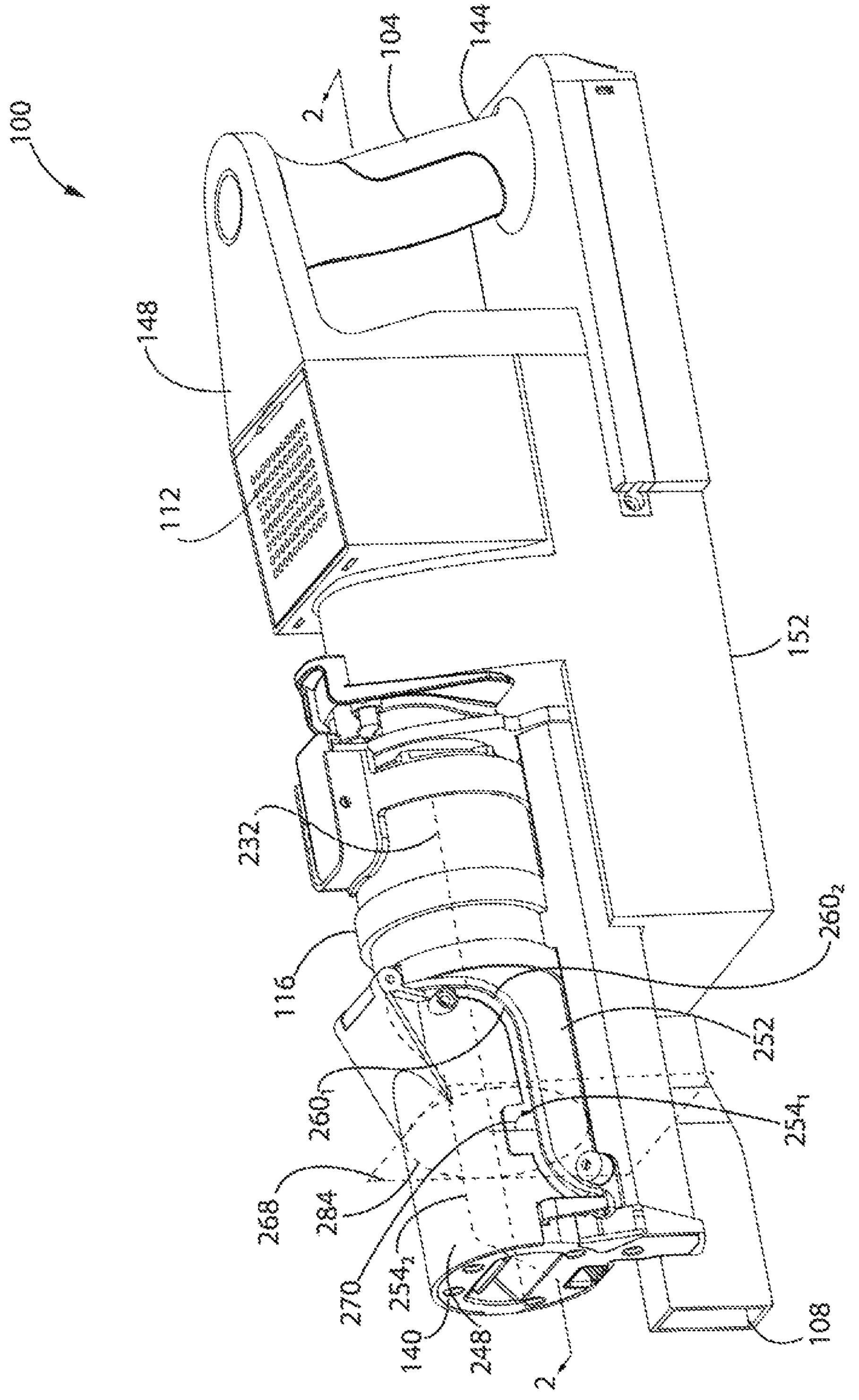
FIG. 1 is a perspective view of a surface cleaning apparatus in accordance with an embodiment.

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, two elements are said to be "parallel" where those elements are parallel and spaced apart, or where those elements are collinear.

Some elements herein may be identified by a part number, which is composed of a base number followed by an alphabetical or subscript-numerical suffix (e.g. **112*a*, or $\mathbf{112}_1$). Multiple elements herein may be identified by part numbers that share a base number in common and that differ by their suffixes (e.g. $\mathbf{112}_1$, $\mathbf{112}_2$, and $\mathbf{112}_3$). All elements with a common base number may be referred to collectively or generically using the base number without a suffix (e.g. 112**).

General Description of a Hand Vacuum Cleaner

Referring to FIGS. 1-4, the following is a general discussion of embodiments of an apparatus 100, which provides a basis for understanding several of the features that are discussed herein. As discussed subsequently, each of the features may be used individually or in any particular combination or sub-combination in these or in other embodiments disclosed herein.

Embodiments described herein include an improved cyclonic air treatment member 116, and a surface cleaning apparatus 100 including the same. Surface cleaning apparatus 100 may be any type of surface cleaning apparatus, including for example a hand vacuum cleaner as shown in FIG. 1-2, a stick vacuum cleaner, an upright vacuum cleaner as shown in FIG. 3-4, a canister vacuum cleaner, an extractor, or a wet/dry type vacuum cleaner.

Figure 2:
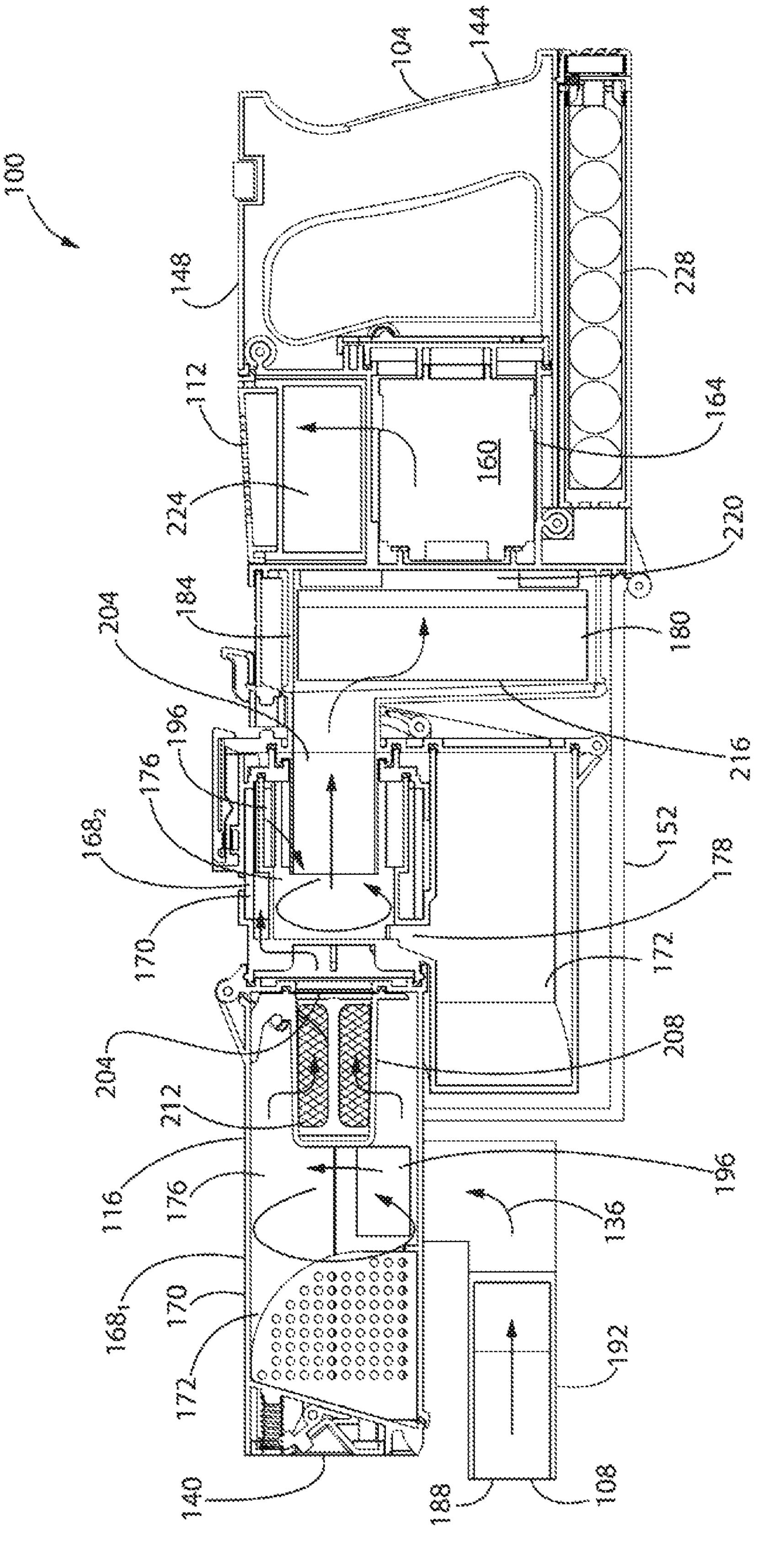
FIG. 2 is a cross-sectional view taken along line 2-2 in FIG. 1.

In FIGS. 1-2, surface cleaning apparatus 100 is illustrated as a hand vacuum cleaner, which may also be referred to also as a “handvac” or “hand-held vacuum cleaner”. As used herein, a hand vacuum cleaner is a vacuum cleaner that can be operated to clean a surface generally one-handedly. That is, the entire weight of the vacuum may be held by the same one hand used to direct a dirty air inlet of the vacuum cleaner with respect to a surface to be cleaned. For example, handle 104 and dirty air inlet 108 may be rigidly coupled to each other (directly or indirectly), such as being integrally formed or separately molded and then non-removably secured together (e.g. adhesive or welding), so as to move as one while maintaining a constant orientation relative to each other. This is to be contrasted with canister and upright vacuum cleaners, whose weight is typically supported by a surface (e.g. a floor) during use. When a canister vacuum cleaner is operated, or when an upright vacuum cleaner is operated in a ‘lift-away’ configuration, a second hand is typically required to direct the dirty air inlet at the end of a flexible hose.

Figure 3:
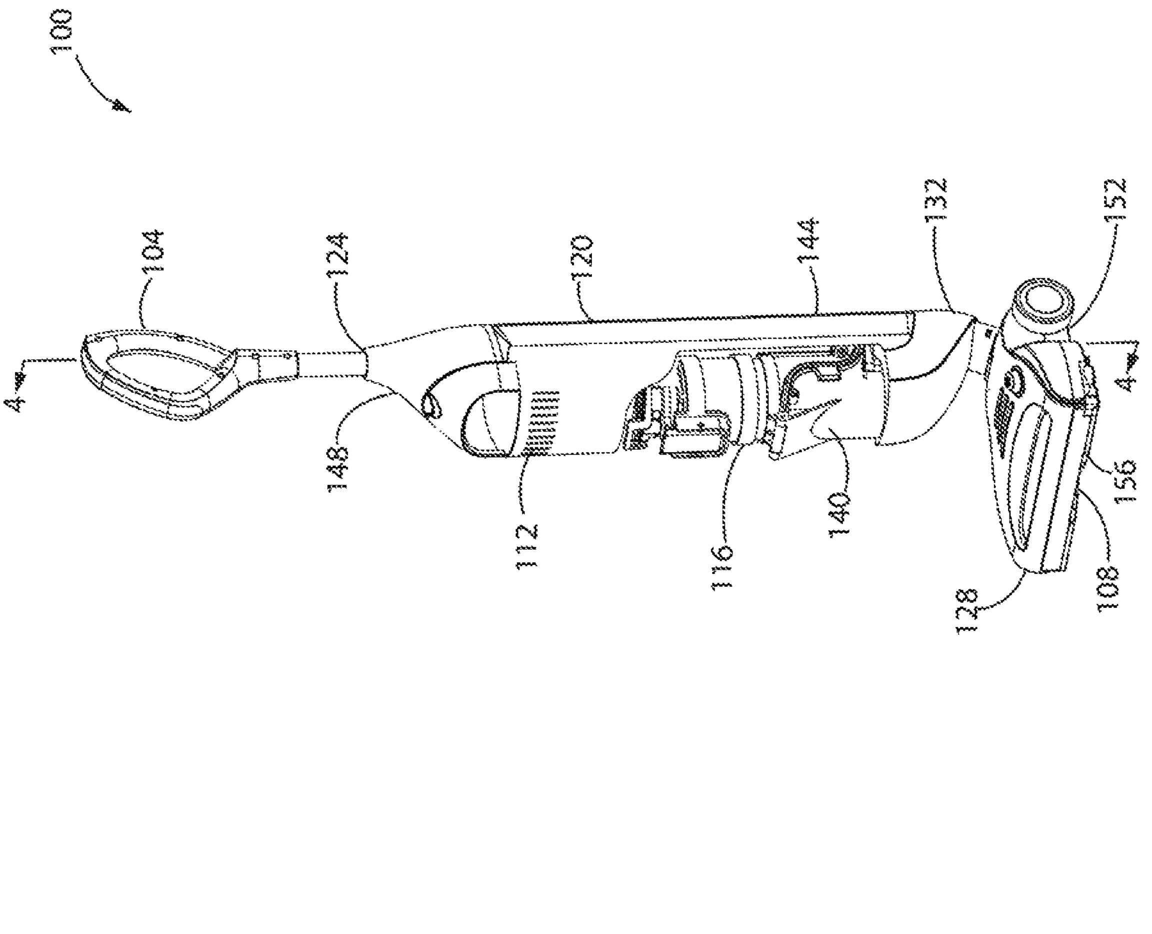
FIG. 3 is a perspective view of a surface cleaning apparatus in accordance with an embodiment.
Figure 4:
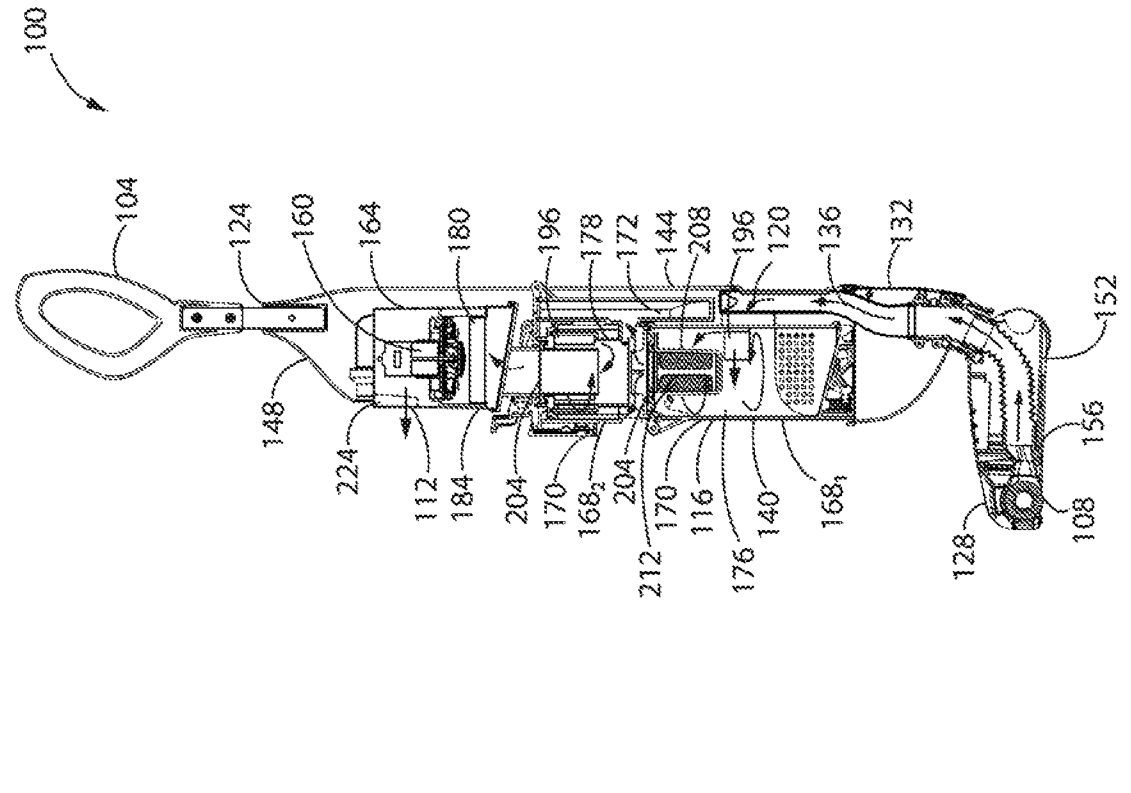
FIG. 4 is a cross-sectional view taken along line 4-4 in FIG. 3.

In the example of FIGS. 3-4, upright vacuum cleaner 100 is shown including an upright section 120. Handle 104 is connected to an upper end 124 of upright section 120, and a surface cleaning head 128 (also referred to as a ‘floor cleaning head’) is movably (e.g. pivotably) connected to a lower end 132 of upright section 120. Upright section 120 may be movable (e.g. pivotable) relative to surface cleaning head 128 between a storage position (shown) and a rearwardly reclined floor cleaning position.

Referring to FIGS. 1-4, surface cleaning apparatus 100 includes an air treatment member 116 (which may be permanently affixed to the main body or may be removable in part or in whole therefrom for emptying), a dirty air inlet 108, a clean air outlet 112, and an air flow path 136 extending between the dirty air inlet 108 and the clean air outlet 112.

Surface cleaning apparatus 100 has a front end 140, a rear end 144, an upper end (also referred to as the top) 148, and a lower end (also referred to as the bottom) 152. In the embodiment of FIGS. 1-2, dirty air inlet 108 is at a lower portion of apparatus front end 140 and clean air outlet 112 is at a rearward portion of apparatus 100 proximate apparatus rear end 144.

It will be appreciated that dirty air inlet 108 and clean air outlet 112 may be positioned in different locations of apparatus 100. For example, FIGS. 3-4 show an example in which dirty air inlet 108 is located at a lower end 156 of surface cleaning head 128, and clean air outlet 112 is located on apparatus front end 140.

Referring again to FIGS. 1-4, a suction motor 160 is provided to generate vacuum suction through air flow path 136, and is positioned within a motor housing 164. Suction motor 160 may be a fan-motor assembly including an electric motor and impeller blade(s). In the illustrated embodiment, suction motor 160 is positioned in the air flow path 136 downstream of air treatment member 116. In this configuration, suction motor 160 may be referred to as a “clean air motor”. Alternatively, suction motor 160 may be positioned upstream of air treatment member 116, and referred to as a “dirty air motor”.

In the illustrated embodiments, apparatus 100 is shown having two cyclonic cleaning stages $\mathbf{168_1}$ and $\mathbf{168_2}$ arranged in series with each other. It will be appreciated that air treatment member 116 may include a single cleaning stage (e.g., first cyclonic cleaning stage $\mathbf{168_1}$ or second cyclonic cleaning stage $\mathbf{168_2}$) or two or more cyclonic cleaning stages (e.g., both first and second cleaning stages $\mathbf{168_1}$ and $\mathbf{168_2}$). Each cyclonic cleaning stage 168 may include one cyclone 170 as shown, or many cyclones arranged in parallel with each other, and may include one dirt collection chamber 172 or many dirt collection chambers 172, of any suitable configuration. For example, FIG. 2 exemplifies an embodiment wherein second cyclonic cleaning stage $\mathbf{168_2}$ includes a cyclone chamber 176 having a dirt outlet 178 to an external dirt collection chamber 172. Each cyclone 170 may have its own dirt collection chamber as shown. Alternatively or in addition, two or more cyclones 170 may share a common dirt collection chamber. Alternately, as also exemplified in FIG. 2, a cyclone $\mathbf{168_1}$ may have a dirt collection region in a portion of the cyclone chamber (e.g., a lower end of a cyclone chamber or an end of the cyclone chamber distal to the air outlet end of the cyclone chamber).

Air treatment member 116 is configured to remove particles of dirt and other debris from the air flow. In the illustrated example, air treatment member 116 includes a cyclone assembly (also referred to as a “cyclone bin assembly”) having at least a first cyclonic cleaning stage $\mathbf{168_1}$ with a cyclone 170 and a dirt collection chamber 172 (also referred to as a “dirt collection region”, “dirt collection bin”, “dirt bin”, or “dirt chamber”). Cyclone 170 has a cyclone chamber 176. As exemplified, dirt collection chamber 172 may be external to the cyclone chamber 176 (i.e. dirt collection chamber 172 may have a discrete volume from that of cyclone chamber 176), or dirt collection chamber 172 may be a dirt collection region located partially or entirely within a volume of cyclone chamber 176. Cyclone 170 and dirt collection chamber 172 may be of any configuration suitable for separating dirt from an air stream and collecting the separated dirt respectively.

Referring to FIGS. 2 and 4, surface cleaning apparatus 100 may include a pre-motor filter 180 provided in the air flow path 136 downstream of air treatment member 116 and upstream of suction motor 160. Pre-motor filter 180 may be formed from any suitable physical, porous filter media. For example, pre-motor filter 180 may be one or more of a foam filter, felt filter, HEPA filter, or other physical filter media. In some embodiments, pre-motor filter 180 may include an electrostatic filter, or the like. As shown, pre-motor filter 180 may be located in a pre-motor filter housing 184 that is external to the air treatment member 116.

As shown in FIG. 2, dirty air inlet 108 may be the inlet end 188 of an air inlet conduit 192. Optionally, inlet end 188 of air inlet conduit 192 can be used as a nozzle to directly clean a surface. Alternatively, or in addition to functioning as a nozzle, air inlet conduit 192 may be connected (e.g. directly connected) to the downstream end of any suitable accessory tool such as a rigid air flow conduit (e.g., an above floor cleaning wand), a crevice tool, a mini brush, and the like. As shown, dirty air inlet 108 may be positioned forward of air treatment member 116, although this need not be the case.

In the embodiments of FIGS. 2 and 4, the air treatment member 116 comprises one or more cyclonic cleaning stages 168, the air treatment air inlet is a cyclone air inlet 196 (e.g. a tangential air inlet of first stage $\mathbf{168_1}$), and the air treatment member air outlet is a cyclone air outlet 204 (e.g. of second stage $\mathbf{168_2}$). In operation, after activating suction motor 160, dirty air enters apparatus 100 through dirty air inlet 108 and is directed along air inlet conduit 192 to the cyclone air inlet 196 of first stage $\mathbf{168_1}$. As shown, cyclone air inlet 196 may direct the dirty air flow to enter cyclone chamber 176 in a tangential direction so as to promote cyclonic action. Dirt particles and other debris may be disentrained (i.e. separated) from the dirty air flow as the dirty air flow travels through first cyclonic stage $\mathbf{168_1}$—from the respective cyclone air inlet 196 to cyclone air outlet 204. The disentrained dirt particles and debris may collect in dirt collection chamber or region 172 of first stage $\mathbf{168_1}$, where the dirt particles and debris may be stored until the dirt collection region is emptied. From cyclone air outlet 204, the air may flow downstream through second stage $\mathbf{168_2}$—from the respective cyclone air inlet(s) 196 to cyclone air outlet 204, whereby separated dirt particles may discharge through dirt outlet 178 into dirt collection chamber 172.

Air exiting a cyclone chamber 176 may pass through an outlet passage 208 located upstream of the cyclone air outlet 204. Cyclone chamber outlet passage 208 may also act as a vortex finder to promote cyclonic flow within cyclone chamber 176. In some embodiments, cyclone outlet passage 208 may include a screen or shroud 212 (e.g. a fine mesh screen) in the air flow path 136 to remove large dirt particles and debris, such as hair, remaining in the exiting air flow.

From cyclone air outlet 204 of second stage $\mathbf{168_2}$, the air flow may be directed into pre-motor filter housing 184 at an upstream side 216 of pre-motor filter 180. The air flow may pass through pre-motor filter 180, and then exit through pre-motor filter housing air outlet 220 into motor housing 164. At motor housing 164, the clean air flow may be drawn into suction motor 160 and then discharged from apparatus 100 through clean air outlet 112. Prior to exiting the clean air outlet 112, the treated air may pass through a post-motor filter 224, which may include one or more layers of filter media.

Power may be supplied to suction motor 160 and other electrical components of apparatus 100 from an onboard energy storage member 228 (FIG. 2) which may include, for example, one or more batteries or other energy storage device. In the example of FIG. 2, apparatus 100 includes a battery pack 228. Battery pack 228 may be permanently connected to apparatus 100 and rechargeable in-situ, or removable from apparatus 100. In the example shown, battery pack 228 is located below handle 104. Alternatively or in addition to battery pack 228, power may be supplied to apparatus 100 by an electrical cord (not shown) connected to apparatus 100 that can be electrically connected to mains power by at a standard wall electrical outlet.

Cyclone

Embodiments herein relate to an openable cyclone sidewall. This feature may be used by itself in any surface cleaning apparatus or in any combination or sub-combination with any other feature or features described herein.

A cyclone separates dirt and debris from an air stream that is moved through a cyclone chamber. Separated dirt and debris may be collected in a dirt collection chamber that is external to the cyclone chamber (e.g., vie a cyclone chamber dirt outlet) or separated dirt and debris may be collected in a dirt collection region that is interior of the cyclone as exemplified by cyclone $\mathbf{168_1}$ of FIG. 2. A cyclone may be emptyable through an openable end door. However, some separated dirt and debris may collect on other interior surfaces of the cyclone, which may not be easily removed through the openable end door. For example, dirt and debris may accumulate or become entangled on the screen of a vortex finder of the cyclone. If not removed, this dirt and debris will occupy space inside the cyclone thereby reducing the volume available for cyclonic flow, which may reduce the dirt separation efficiency of the air treatment member. According to this aspect, a cyclone chamber is openable other than by merely opening the end of the cyclone chamber.

Figure 5:
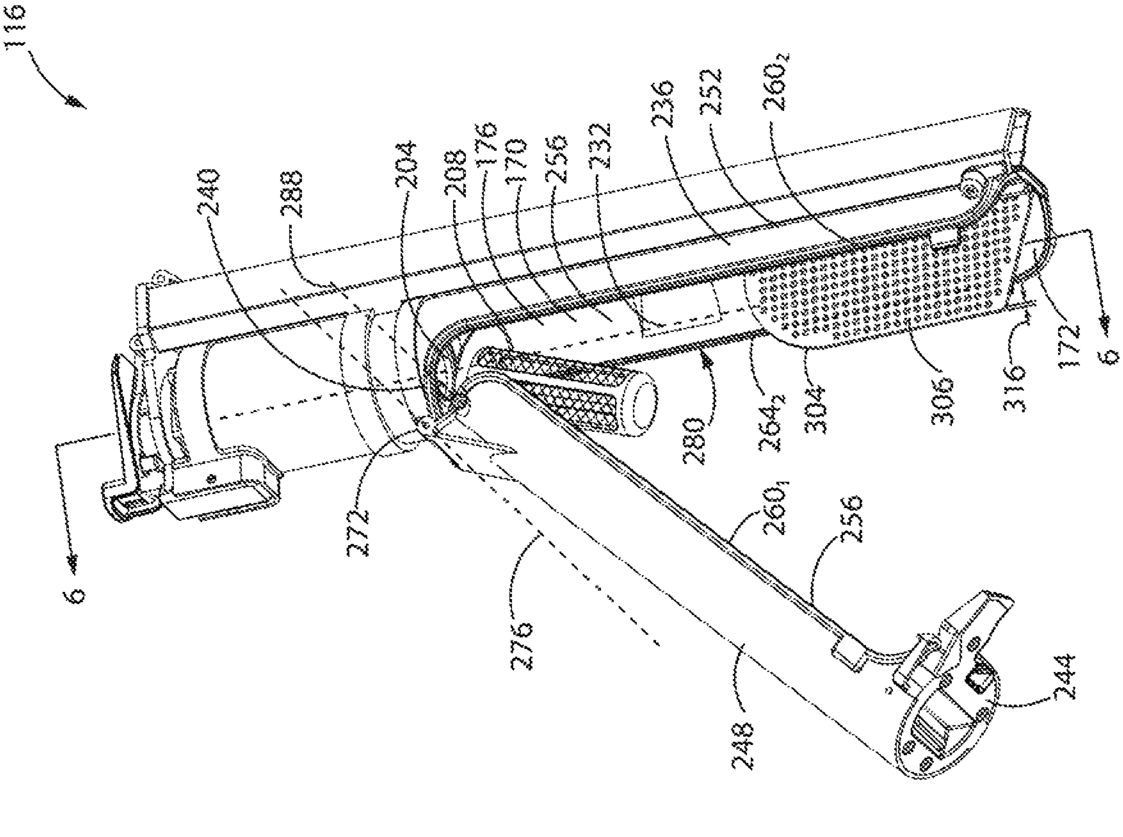
FIG. 5 is a perspective view of an air treatment member in an open position, in accordance with an embodiment.
Figure 6:
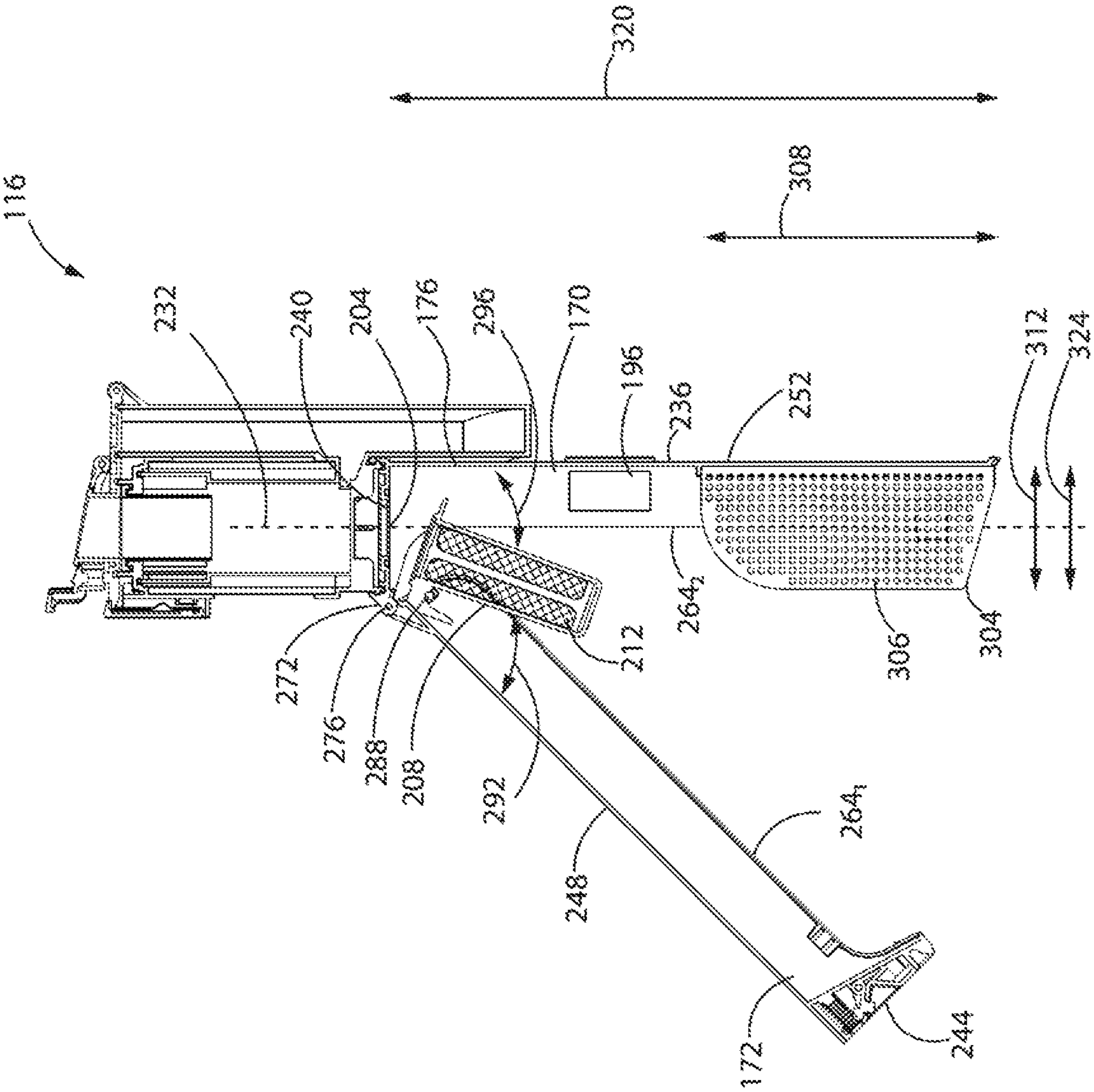
FIG. 6 is a cross-sectional view taken along line 6-6 in FIG. 5.

FIGS. 5-6 exemplify a cyclone, which may be referred to as a cyclonic air treatment member 116, in accordance with an embodiment. As shown, cyclone bin assembly includes a cyclone 170 with a cyclone chamber 176, a cyclone air inlet 196, a cyclone air outlet 204, and a cyclone axis of rotation 232 (also referred to as cyclone axis 232). The cyclone chamber 176 has a cyclone chamber sidewall 236 that extends axially between the chamber first end 240 and the chamber second end 244.

As exemplified, in accordance with this aspect, cyclone chamber sidewall 236 comprises a first portion 248 and a second portion 252 which are moveably mounted with respect to each other so as to provide an area to access the interior of the cyclone chamber that is larger than the cross sectional area of the end wall of the cyclone at second end 244. As exemplified, first portion 248 is moveable relative to sidewall second portion 252 between a closed position (FIG. 1) and an open position (FIGS. 5-6). In the closed position (FIG. 1), sidewall first portion 248 may meet (e.g. seal to) sidewall second portion 252 at first and second junctures $\mathbf{254_1}$ and $\mathbf{254_2}$. This closes cyclone chamber 176 so that cyclone 170 can function to separate dirt and debris from air flow moving through cyclone chamber 176. In the open position, sidewall first portion 248 is at least partially separated (e.g. spaced apart from) sidewall second portion 252 to define opening(s) 256 into cyclone chamber 176. Dirt and debris collected, accumulated, or tangled within cyclone chamber 176 can be easily removed through cyclone chamber opening(s) 256.

Referring to FIGS. 1, 5, and 6, each juncture 254 may be defined where an edge of sidewall first portion 248 meets an edge of sidewall second portion 252 in the closed position. As shown, first portion 248 may include first edge $\mathbf{260_1}$, second portion 252 may include first edge $\mathbf{260_2}$, and edges 260 may abut each other in the closed position to define first juncture $\mathbf{254_1}$. Similarly, first portion 248 may include second edge $\mathbf{264_1}$, second portion 252 may include second edge 2642, and edges 264 may abut each other in the closed position to define second juncture $\mathbf{254_2}$. In the open position (FIGS. 5-6), both edges 260, 264 may be moved apart to create an opening 256 into cyclone chamber 176 for emptying dirt and debris contained inside or, as exemplified in FIG. 14, one of the edges 260, 264 may be moved apart to create an opening 256 into cyclone chamber 176.

Edges 260, 264 may be the plastic edges of the cyclone chamber side wall that abut each other or, alternately, a gasket or the like may be provided to assist in providing a seal along the juncture. The edges may be planar or an alternate shape to assist in providing a seal, such as tongue and groove.

One or both of junctures 254 may extend at a (non-zero) angle 270 to a plane 268 that is transverse to cyclone axis 232. For example, as exemplified in FIG. 5, the juncture may extend axially (perpendicular to plane 268) or at an angle between 0° and 90° exclusive, as exemplified in FIG. 10.

A sidewall first portion 248 that opens along junctures 254 angled in this way can provide an opening 256 into cyclone chamber 176, which has an axial dimension and which has a greater cross-sectional area than opening the end wall of a cyclone, thereby providing better access to dirt and debris contained inside cyclone chamber 176. In contrast, an cyclonic air treatment member having only an end wall door, may require the user to reach their hand and arm through the open end wall door into the cyclone chamber to clear dirt and debris (e.g. accumulated or tangled on a vortex finder), which may be unpleasant for the user.

Sidewall first portion 248 may be moveably mounted with respect to sidewall second portion 252, sidewall second portion 252 may be moveably mounted with respect to sidewall first portion 248 or both sidewall portions 248, 252 may be moveable with respect to each other.

In the illustrated example, junctures $\mathbf{254_1}$ and $\mathbf{254_2}$ extend axially parallel to cyclone axis 232. When sidewall first portion 248 is moved relative to sidewall second portion 252 to separate sidewall first portion 248 from sidewall second portion 252 along junctures 254, the resulting cyclone chamber opening 256 extends axially (i.e. along an axial length of cyclone chamber 176). An advantage of this design is that the axial dimension of cyclone chamber opening 256 provides a large opening 256 and thereby improves user-access to dirt and debris that may be located throughout cyclone chamber 176. For example, when sidewall first portion 248 is moved to the open position, cyclone chamber opening 256 may allow user access to debris at both cyclone chamber ends 240, 244 without having to unpleasantly reach a length of their arm into the dirty and dusty cyclone chamber 176.

Sidewall first portion 248 may be movably mounted with respect to sidewall second portion 252 in any manner that allows sidewall first portion 248 to move between a closed position (FIG. 1) and an open position (FIGS. 5-6). For example, sidewall first portion 248 may be rotatable (e.g., as exemplified in FIGS. 27-30), pivotable (as exemplified in FIGS. 5 and 14), translatable (as exemplified in FIG. 31), or any combination thereof, relative to sidewall second portion 252.

Referring to FIGS. 5-6, sidewall first portion 248 is pivotable relative to sidewall second portion 252. As exemplified, sidewall first portion 248 is connected to cyclone 170 by a hinge 272 that defines a rotation axis 276 (sometimes referred to as a 'pivot axis').

Rotation axis 276 may have any position suitable to allow sidewall first portion 248 to pivot relative to sidewall second portion 252 between the closed and open positions. For example, rotation axis 276 may be positioned external to cyclone chamber 176 as shown, or rotation axis 276 may extend through cyclone chamber 176. As shown, positioning rotation axis 276 external cyclone chamber 176 can allow hinge 272 to be located outside of cyclone chamber 176, such that hinge 272 does not interfere with air flow through cyclone chamber 176 and does not occupy space within cyclone chamber 176. Rotation axis 276 may also be located at any location along the axial length of the cyclone. For example, axis 276 may be located at one end of the cyclone chamber as exemplified in FIG. 5, or at an intermediate location along the length of the cyclone sidewall.

Rotation axis 276 may have any orientation suitable to allow sidewall first portion 248 to pivot relative to sidewall second portion 252 between the closed and open positions. For example, rotation axis 276 may be oriented transverse to cyclone axis 232 (see, e.g., FIG. 5), or rotation axis 276 may extend axially (e.g. parallel to cyclone axis 232, see e.g., FIG. 14). An advantage of the design of FIG. 5 is that the end of sidewall first portion 248 distal to axis 276 may rotate farther away from sidewall second portion 252 in the open position per degree of rotation. Accordingly, rotation axis 276 positioned and oriented as shown may provide greater user access to a lower end of the interior of cyclone chamber 176 to remove the contained dirt and debris.

Hinge 272 may be any device suitable to (directly or indirectly) connect sidewall first portion 248 to sidewall second portion 252 and allow sidewall first portion 248 to rotate relative to sidewall second portion 252 between the closed and open positions. For example, hinge 272 may have a multi-part design as shown, or hinge 272 may be a single-part living hinge. As compared to a single-part living hinge 272, a multi-part hinge 272 typically provides greater strength and working life (e.g. number of rotations before failure). A single-part living hinge 272 allows chamber first end 240 to be integrally formed with cyclone 170, which reduces the number of components, which in turn can reduce manufacturing and assembly costs.

Referring to FIGS. 1, 5, and 6, a cyclone chamber opening 256 may have an area 280 that is larger than an opening provided by an openable door at cyclone end wall 244. For example, opening area 280 may be greater than a cross-sectional area 284 measured on a plane 268 that is perpendicular to cyclone axis 232. The comparatively larger opening area 280 provides greater user access to remove dirt and debris from an interior of cyclone chamber 176 as compared to an end wall door. In some embodiments, opening area 280 may be at least 120% (e.g. 120% to 500%) of chamber cross-sectional area 284. In the illustrated example, the opening area 280 of each cyclone chamber opening 256 is at least 200% of chamber cross-sectional area 284.

Referring to FIGS. 5-6, one or more parts of cyclone chamber 176 or dirt collection chamber 172 may be movable with sidewall first portion 248 to the open position. This can allow those part(s) to be reoriented in the open position in a way that provides greater user access to dirt and debris collected on those part(s), and/or that allows dirt and debris collected on those part(s) to fall out of chamber(s) 172, 176 by gravity (e.g. into a waste bin below). In general, the more dirt and debris that falls out of chamber(s) 172, 176 by gravity alone, results in less unpleasant user-contact with dirt and debris to clean out chamber(s) 172, 176.

In the illustrated example, cyclone chamber second end wall 244 is connected to sidewall first portion 248 so that cyclone chamber second end wall 244 rotates with sidewall first portion 248 to the open position. This tilts the surface of cyclone chamber second end wall 244 towards an axial (e.g. vertical) orientation, which can allow dirt and debris collected on cyclone chamber second end wall 244 to fall out of chambers 172, 176 by gravity. This also removes cyclone chamber second end wall 244 from sidewall second portion 252 so that dirt and debris associated with sidewall second portion 252 can fall out of chambers 172, 176 by gravity instead of forming a pile on cyclone chamber second end wall 244 at the bottom end.

In an alternative embodiment, cyclone chamber second end wall 244 may remain with sidewall second portion 252 when sidewall first portion 248 is moved to the open position.

In any embodiment, cyclone chamber second end wall 244 may be openable, e.g., it may be pivotably mounted to one of the sidewall portions 248, 252.

As mentioned previously, FIGS. 10-11 exemplify an embodiment wherein the juncture extends at an angle between 0° and 90° exclusive to transverse plane 268. The sidewall portions 248, 252 meet along a sidewall juncture 254 in the closed position (FIG. 10) and may be pivoted away from each other to the open position (FIG. 11). In the open position, edges 260 of sidewall portions 248, 252 are spaced apart, and each sidewall portion 248, 252 has a cyclone chamber opening 256.

In accordance with this embodiment, sidewall juncture 254 forms (non-zero) angles to both cyclone axis 232 and transverse plane 268. Accordingly, sidewall juncture 254 has an axial extent or dimension that creates comparatively large area chamber openings 256 in the open position, but that does not extend axially parallel to cyclone axis 232. As compared to a sidewall juncture that is parallel to cyclone axis 232, the illustrated sidewall juncture 254 has a shorter linear length, which may result in less cost, less complexity, and greater reliability in maintaining an air tight seal along sidewall juncture 254 in the closed position.

Sidewall juncture 254 may be located anywhere between cyclone chamber ends 240, 244. Preferably, sidewall juncture 254 is spaced apart from cyclone chamber end 240, 244. This positions sidewall juncture 254 more centrally between cyclone chamber ends 240, 244 whereby in the open position, the maximum distance from cyclone chamber openings 256 to an interior surface of cyclone chamber 176 is reduced. For example, sidewall juncture 254 may be spaced from cyclone chamber first end 240 by a distance 336, spaced from cyclone chamber second end 244 by a distance 340, and each of distances 336 and 340 may be at least 10%, 20%, 30%, 40% or 50% (e.g. 10% to 50%, 20% to 40%) of cyclone chamber height 320.

Figure 10:
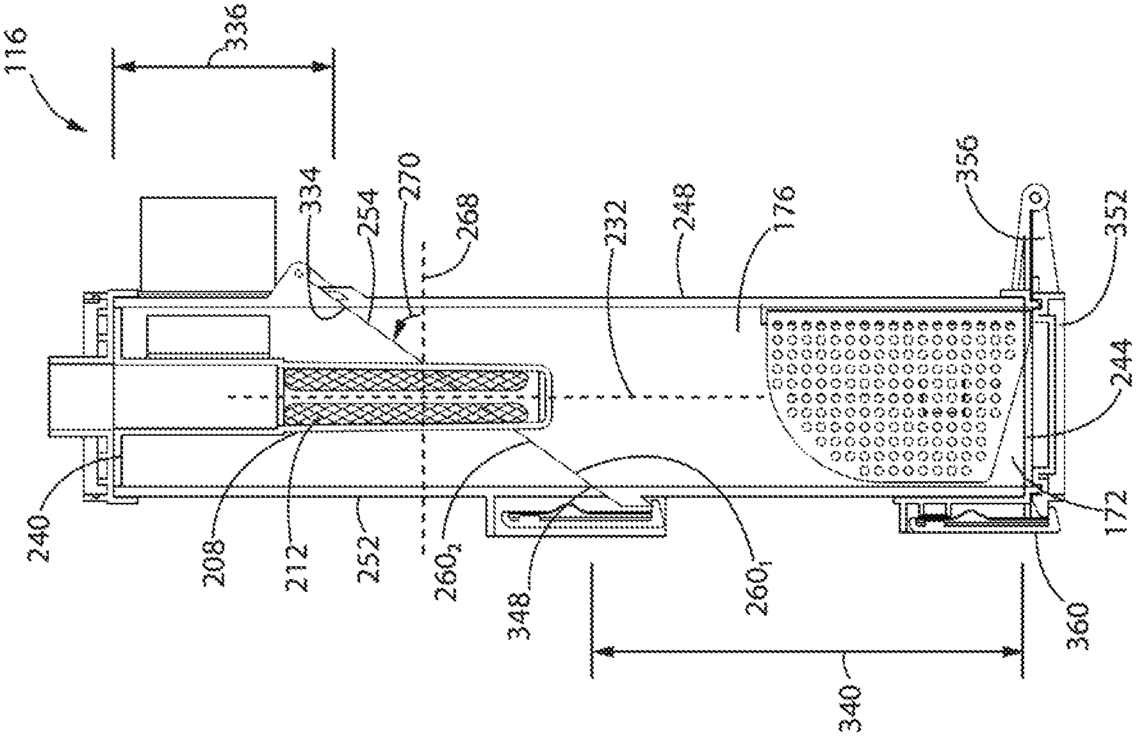
FIG. 10 is a cross-sectional view of an air treatment member, in a closed position, in accordance with another embodiment.
Figure 11:
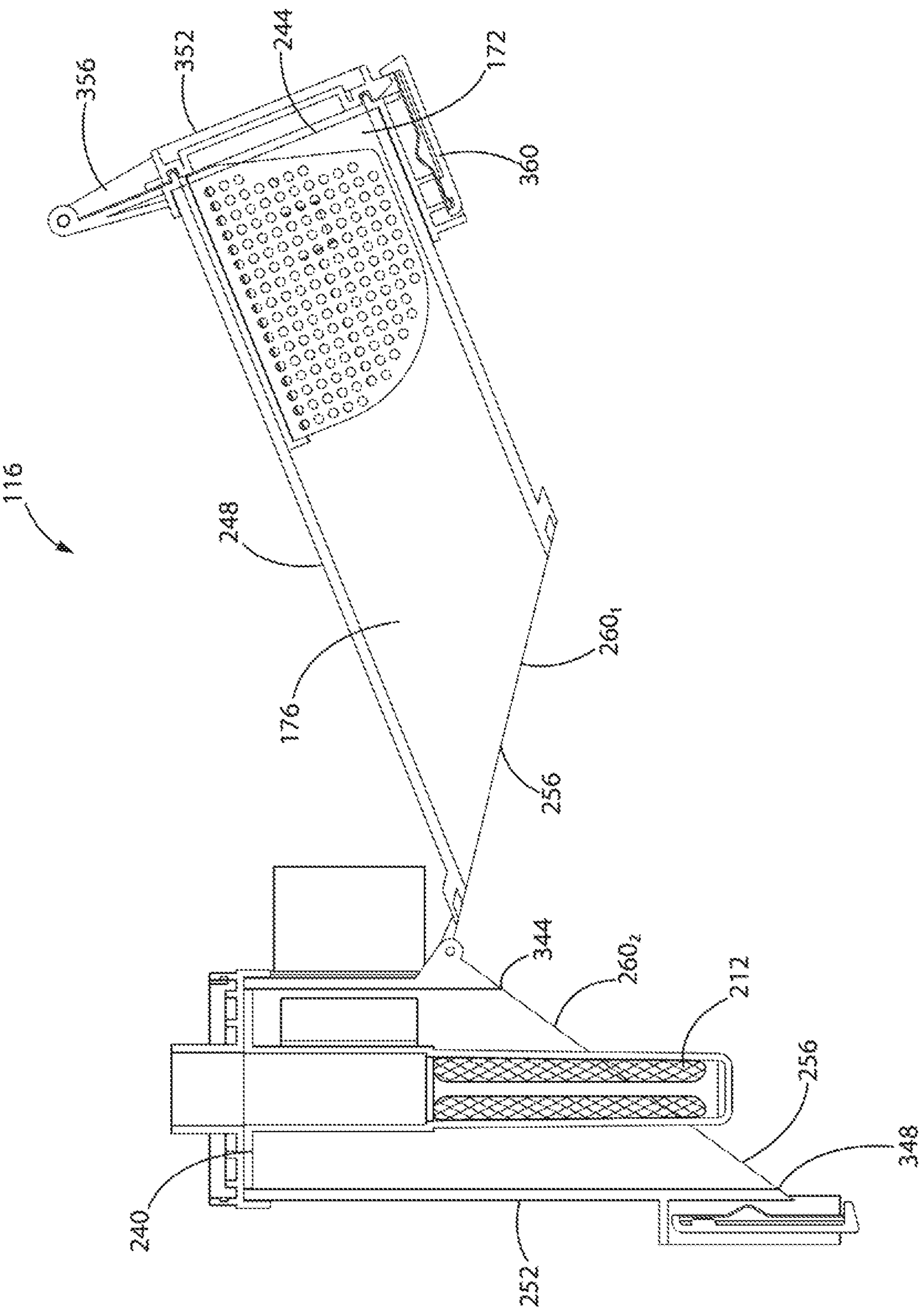
FIG. 11 is a cross-sectional view of the air treatment member of FIG. 10, in an open position.

Still referring to FIGS. 10-11, sidewall juncture 254 has a first end 344 having a first axial position, a second end 348 having a second axial position, and some or all of screen 212 has an axial position located between the axial positions of the sidewall juncture ends 344, 348. As shown in FIG. 11, this can allow some or all of screen 212 to extend out of a cyclone chamber opening 256 when the cyclone is in the open position, which can provide easy user-access to surfaces of screen 212 for cleaning.

As with the embodiment of FIGS. 5 and 6, cyclone second end 244 may be a movable (e.g. pivotable, translatable, and/or removable) end wall 352. As exemplified, cyclone second end 244 includes an openable door 352. Door 352 can be opened to empty the majority of loose dirt and debris contained in cyclone chamber 176. This can mitigate loose dirt and debris spilling uncontrollably when moving sidewall first portion 248 to the open position. An openable door 352 may be provided at one or both ends of the cyclone and, e.g., may be pivotably connected to one or both of sidewall portions 248, 252. In the illustrated example, openable door 352 is pivotably connected by a hinge 356 to sidewall first portion 248, and a latch 360 is provided to removably secure openable door 352 closed.

As mentioned previously, FIG. 14 exemplifies an axially extending pivot axis 276. An advantage of this design is that in the open position, each sidewall portion is opened and the cyclone chamber openings 256 may extend the full axial length of cyclone chamber 176. This provides easy user-access to dirt and debris located anywhere inside of cyclone chamber 176. It will be appreciated that the hinge may extend along only part of the axial length of the sidewall.

Sidewall portions 248, 252 can have any circumferential angular extent. For example, sidewall first portion 248 may have a circumferential angular extent of between 25° and 335°. More preferably, the circumferential angular extent may be more balanced as between sidewall portions 248, 252 so that each sidewall portion 248, 252 has a conveniently large cyclone chamber opening 256 in the open position. For example, the circumferential angular extent of sidewall first portion 248 may be between 135° and 225°. In the illustrated example, both sidewall portions 248 have an angular extent of about 180°. This provides each sidewall portion 248, 252 with a similarly large cyclone chamber opening 256.

Sidewall first portion 248 may be pivotably mounted about an axial rotation axis 276. This allows cyclone 170 to have a relatively smaller footprint when in the open position so that all of cyclone 170 can be underlied by a standard sized waste bin that is collecting dirt and debris falling from cyclone 170. In the illustrated example, rotation axis 276 is parallel to cyclone axis 232. In some embodiments, sidewall hinge 272 is a piano hinge that is provided on an exterior of the sidewall and extends axially along sidewall portions 248, 252.

Figure 14:
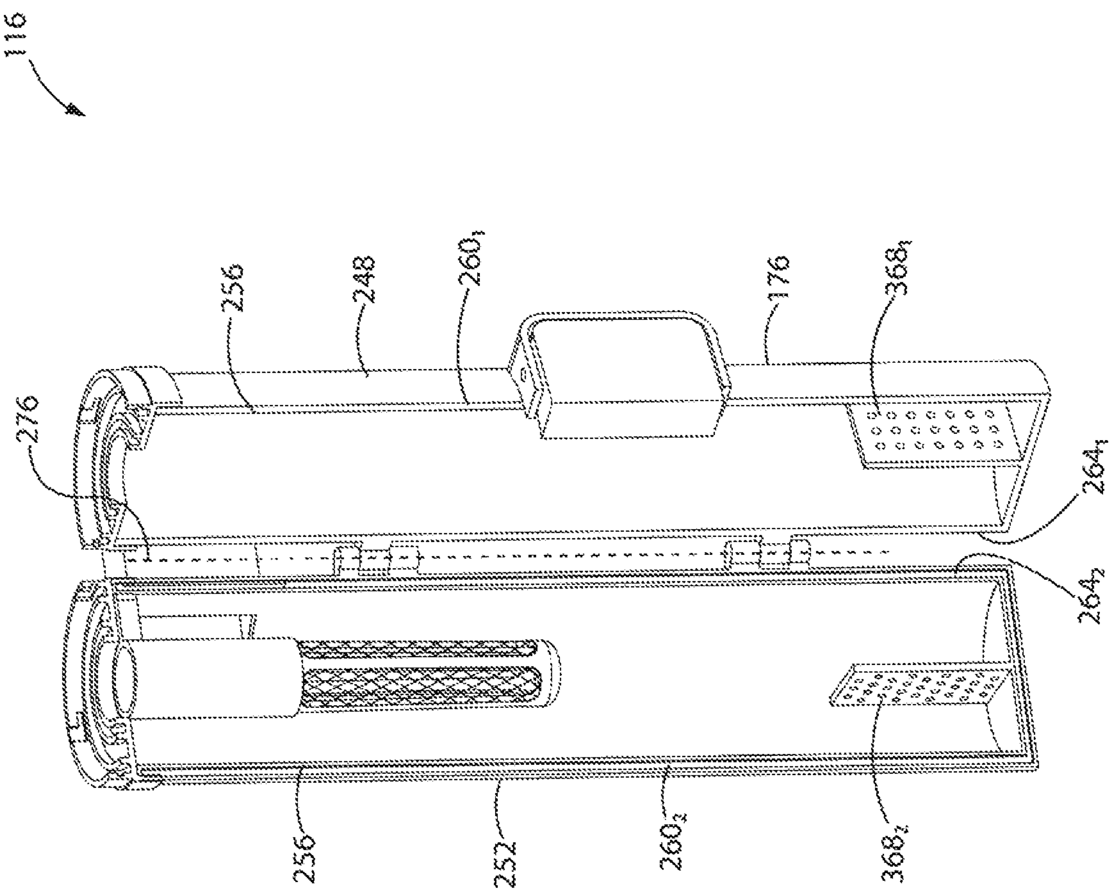
FIG. 14 is a perspective view of an air treatment member in an open position, in accordance with an embodiment.

Hinge 272 may extend from one end of the cyclone chamber to the other end of the cyclone chamber as exemplified in FIG. 14, or it may extend along only part of the axial length. For example, it may extend from one end of the cyclone chamber towards the other end or it may extend along only part of an intermediate section of the sidewall between the first and second axially opposed cyclone ends. In such a case, the sidewall portion that opens may define a door having upper and lower ends that mate with the other sidewall portion along upper and lower edges that extend around a portion of the perimeter of the sidewall.

Figure 19:
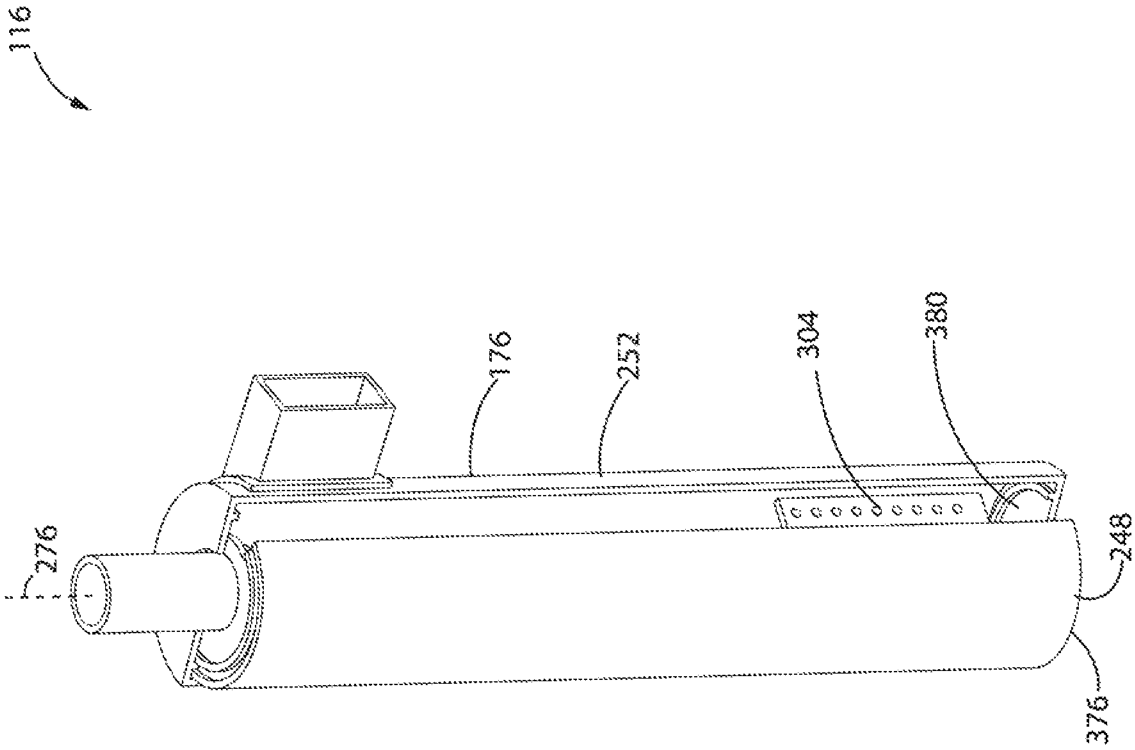
FIG. 19 is a perspective view of an air treatment member with a sidewall portion opened slightly.
Figure 20:
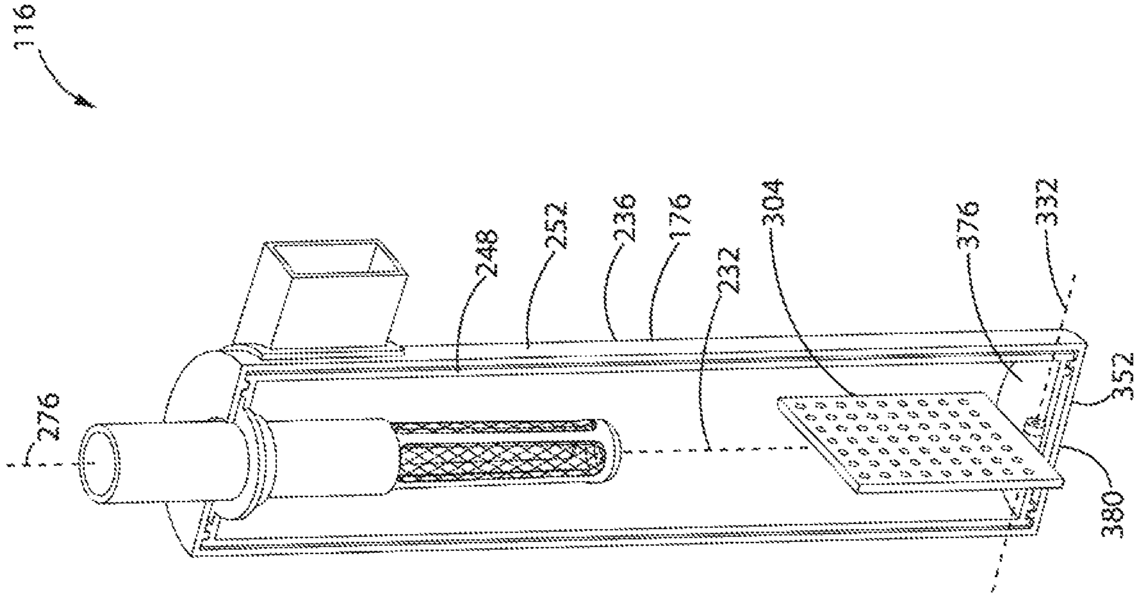
FIG. 20 is a perspective view of the air treatment member of FIG. 19 with the sidewall portion opened fully.
Figure 21:
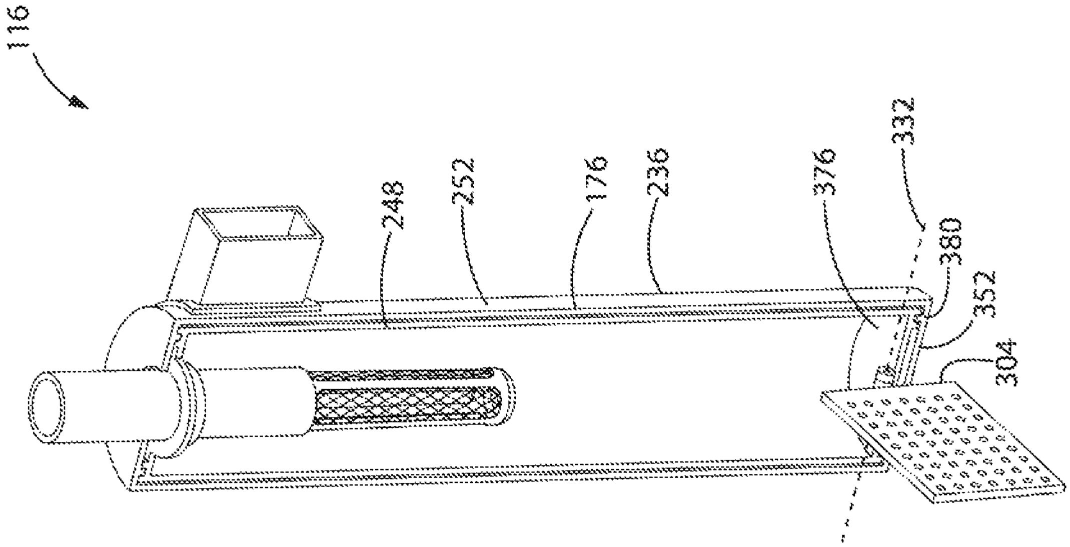
FIG. 21 is a perspective view of the air treatment member of FIG. 19 with the sidewall portion opened fully and an axially extending member rotated.
Figure 22:
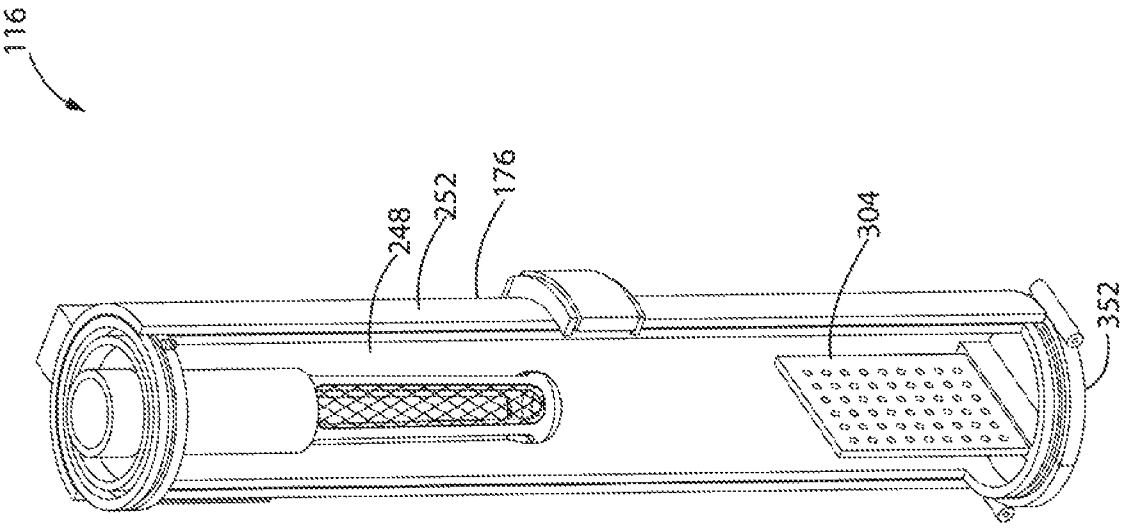
FIG. 22 is a perspective view of an air treatment member in an open position in accordance with an embodiment.

FIGS. 19-21 exemplify an alternate embodiment wherein the axis 276 extends in the direction of the cyclone axis of rotation 232 but wherein the axis 276 extends through the cyclone chamber. Optionally, as exemplified, rotation axis 276 is coaxial or collinear with cyclone axis 232. Sidewall first portion 248 is rotatable about axis 276 relative to sidewall second portion 252 from a closed position to an open position (FIG. 20) in which sidewall portions 248, 252 are partially or completely nested with one another. For example, sidewall first portion 248 may nest within sidewall second portion 252 as shown, or vice versa. An advantage of this design is that it may provide even greater exposure to interior surfaces of cyclone chamber 176. Further, this design may reduce the time and effort required to clean out cyclone chamber 176 because the act of nesting one sidewall portion into the other may empty the outer sidewall portion into the inner sidewall portion or out of cyclone chamber 176. Thus, the user may have only to attend to emptying dirt and debris associated with the inner sidewall portion. Also, an open position in which sidewall portions 248, 252 are nested may reduce the footprint of cyclone chamber 176, which may make it possible or easier to empty cyclone chamber 176 into a waste bin below without spilling.

Each sidewall portion 248, 252 is exemplified as an axial cylindrical segment. In the example shown, each sidewall portion 248, 252 has a circumferential angular extent of approximately 180°. This allows the sidewall portions 248, 252 to completely nest with each other in the open position (FIG. 20). In other embodiments, the circumferential angular extent of each sidewall portion 248, 252 may differ from 180°. For example, the inner sidewall portion 248 may have an angular extent of greater than or less than 180°.

It will be appreciated that cyclone chamber sidewall 236 may include any number of sidewall portions, which are mounted so that they can move relative to each other between a closed position and an open position. Accordingly, while FIGS. 20-21 show an embodiment in which cyclone chamber sidewall 236 includes two sidewall portion 248, 252 that are each an axial cylindrical segment, and which are nested in the open position (FIG. 21), a larger number of segments may be provided. This may permit cyclone chamber 176 to have an open position that provides even greater user-access to the interior volume, surfaces, and contents of cyclone chamber 176. In turn, this may make it easier for the user to clean cyclone chamber 176 of dirt and debris.

Figure 30:
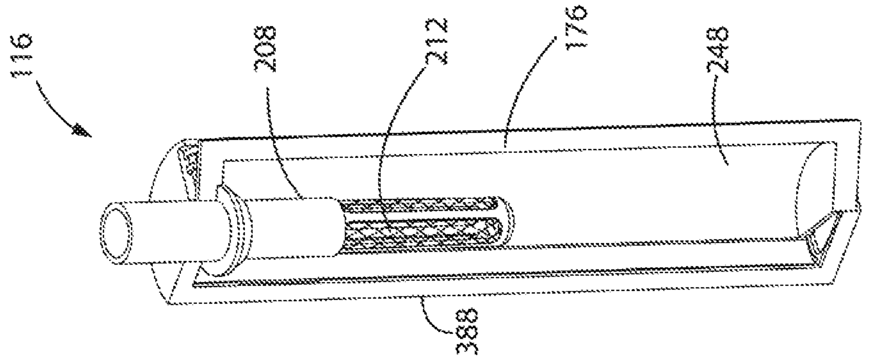
FIGS. 27-30 are perspective views of the air treatment member transitioning from a closed position in FIG. 27 to an open position in FIG. 30, in accordance with an embodiment.
Figure 29:
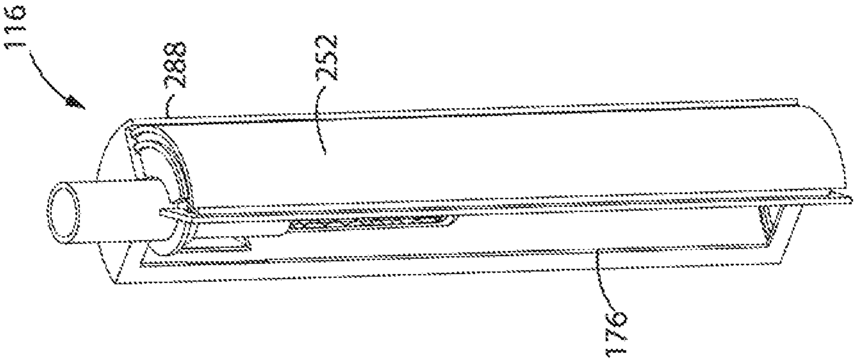
Figure 28:
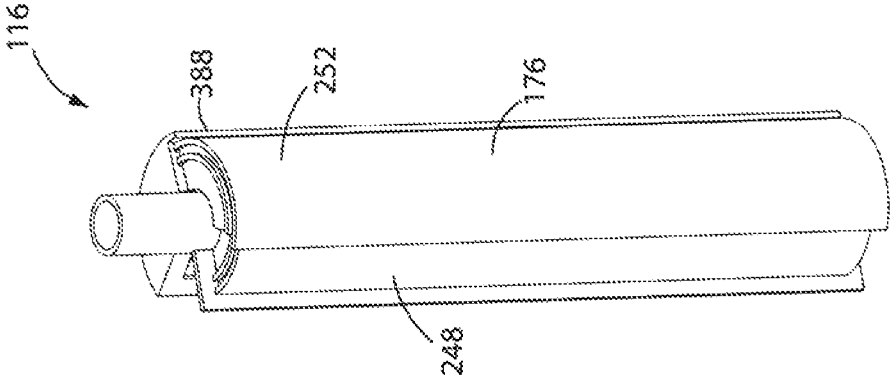
Figure 27:
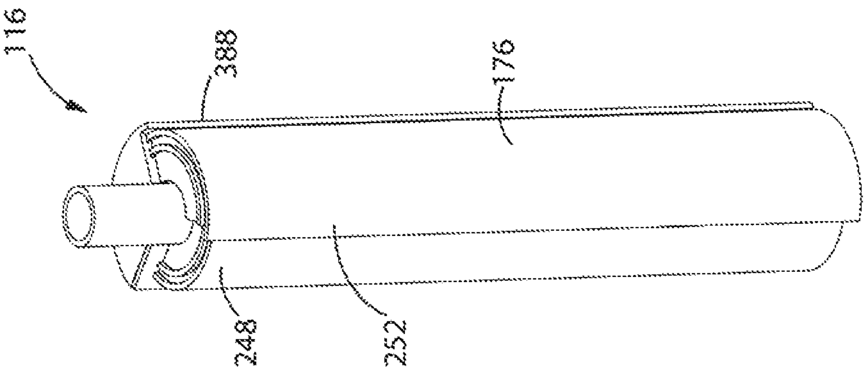
Figure 31:
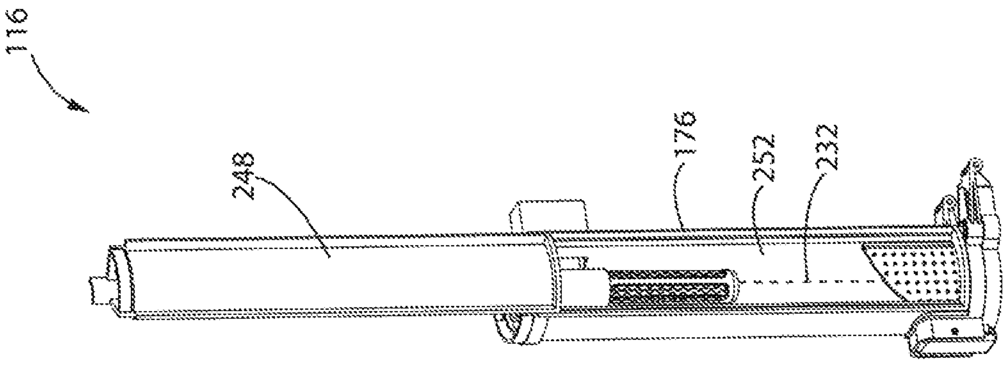
FIG. 31 is a perspective view of an air treatment member with an axially translatable sidewall portion, in an open position, in accordance with an embodiment.

For example, FIGS. 27-30 show an example including three sidewall portions 248, 252, 388, each of which is an axial cylindrical segment, and which are nested in the open position (FIG. 30). Sidewall portions 248, 252, 388 may have the same circumferential angular extent as shown (e.g. approximately 120°), or one or more (or all) of sidewall portions 248, 252, 388 may have a different circumferential angular extent as compared to each other sidewall portion 248, 252, 388. As shown, the larger number of sidewall portions 248, 252, 388 may result in a larger portion of cyclone outlet passage 208 being located outside of cyclone chamber 176 when in the open position, even where cyclone outlet passage 208 is not movably mounted (i.e. where cyclone outlet passage 208 is rigidly connected to cyclone 170). In the illustrated example, cyclone chamber 176 spans approximately 120° in the open position such that approximately 240° (i.e. about two thirds) of cyclone outlet passage 208 is positioned outside of cyclone chamber 176.

Figure 32:
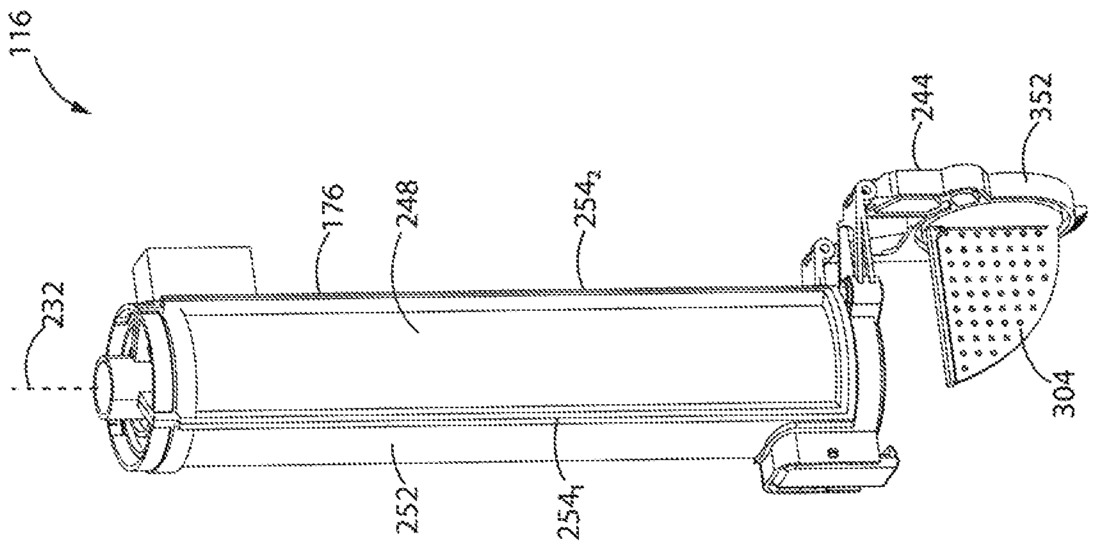
FIG. 32 is a perspective view of the air treatment member of FIG. 31 with the sidewall portion in a closed position and an open end wall.

As mentioned previously, FIGS. 31-32 exemplify an embodiment in which sidewall first portion 248 is axially translatable to the open position as shown. Depending on the manner in which cyclonic air treatment member 116 is connected to the surface cleaning apparatus, this design may prevent cyclone chamber 176 from being opened while connected to the surface cleaning apparatus. As shown, sidewall portions 248, 252 may meet (e.g. be sealed) at first and second junctures 254. First juncture $254_1$ may be parallel to second juncture $254_2$ and angularly spaced around cyclone chamber 176 from second juncture $254_2$. In the example shown, both junctures 254 extend axially (e.g. parallel to cyclone axis 232).

Figure 34:
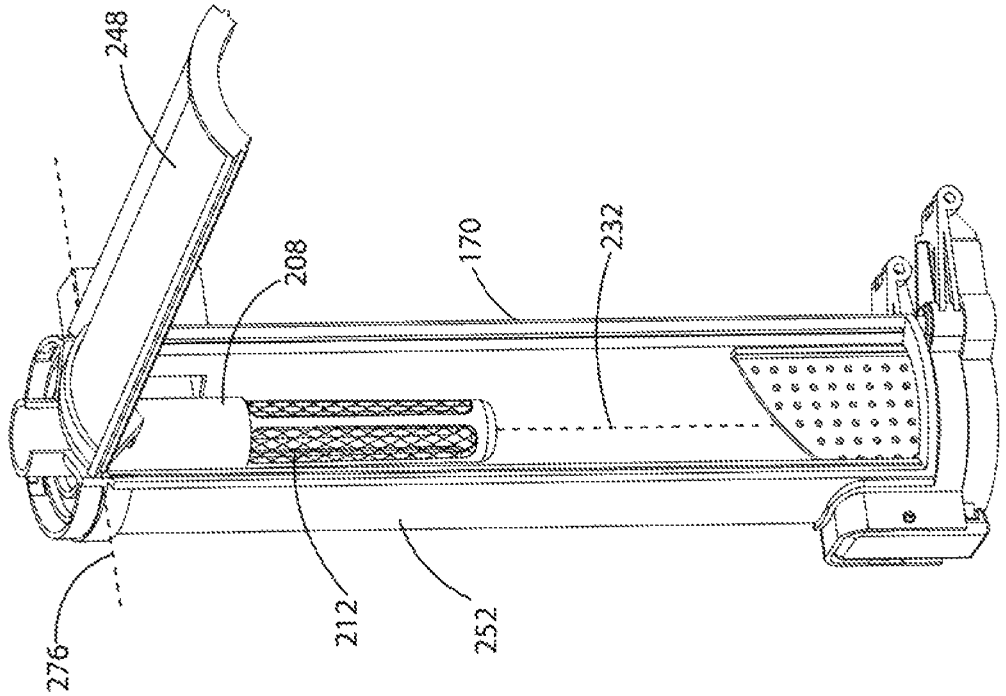

FIG. 34 exemplifies an embodiment in which sidewall first portion 248 is an axial cylindrical segment, which is pivotably mounted to cyclone 170 so that it can rotate about a rotation axis 276, which is transverse (e.g. perpendicular) to cyclone axis 232.

Moveable Screen

Embodiments herein relate to a moveable screen or vortex finder. This feature may be used by itself in any surface cleaning apparatus or in any combination or sub-combination with any other feature or features described herein.

As exemplified in FIGS. 5-6, cyclone 170 may include a cyclone outlet passage (e.g. vortex finder) 208 including a screen 212 that may collect larger dirt particles and debris (e.g. hair) which remains entrained in the air flow exiting the cyclone 170. When sidewall first portion 248 is in an open position, a portion of screen 212 may remain in close proximity to one of sidewall portions 248, 252, and that proximity may make user access to clean that portion of screen 212 difficult (e.g. the clearance may be too small for a user's fingers). In some embodiments, cyclone outlet passage 208 may be movably mounted with respect to one or both of the sidewall portions 248, 252. This can allow the user better access to clean surfaces of screen 212.

In accordance with this aspect, the cyclone outlet passage (e.g. vortex finder) 208 is moveable so as to permit easier access to more of the perimeter of the outlet passage and, optionally, all of the perimeter of the outlet passage.

Cyclone outlet passage 208 may be movably mounted with respect to one or both sidewall portions 248, 252 in any manner suitable to improve user-access to some or all of the outer surface of screen 212. For example, cyclone outlet passage 208 may be removable from cyclone 170, or cyclone outlet passage 208 may be rotatable, translatable, or both while remaining connected to cyclone 170.

As exemplified in FIGS. 5-6 and 7-9, cyclone outlet passage 208 is movably mounted with respect to both sidewall portions 248, 252. As shown, when sidewall first portion 248 is moved to the open position, cyclone outlet passage 208 is movable away from sidewall portion 252, concurrently, or subsequently, outlet passage 208 may be moved away from sidewall portion 248. This increases the clearances between screen 212 and both sidewall portions 248, 252, which can greatly improve user-access to clean surfaces of screen 212.

Figure 33:
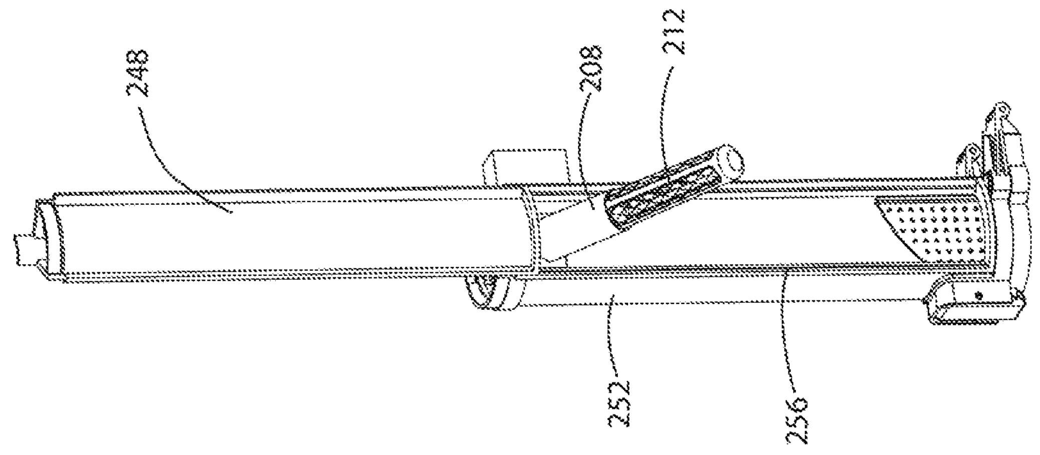
FIG. 33 is a perspective view of the air treatment member of FIG. 31 in an open position with the cyclone outlet passage rotated out of the cyclone chamber in accordance with an embodiment; and, FIG. 34 is a perspective view of an air treatment member in an open position in accordance with an embodiment.

In the illustrated example, cyclone outlet passage 208 is pivotable about a rotation axis 288 relative to sidewall portion 248. As shown, this allows cyclone outlet passage 208 to rotate away from sidewall portion 248 when in the open position. Accordingly, when the sidewall portions are pivoted open and the screen is pivoted to the open position shown in FIG. 6, clearances 292, 296 between screen 212 and sidewall portions 248, 252 respectively increase to provide greater user-access to the outer surface of screen 212 for cleaning. See also FIG. 33.

In the example shown, cyclone outlet passage 208 is pivotably connected to sidewall first portion 248. Alternatively, cyclone outlet passage 208 may be pivotably connected to sidewall second portion 252 or to another portion of cyclone 170.

Figure 12:
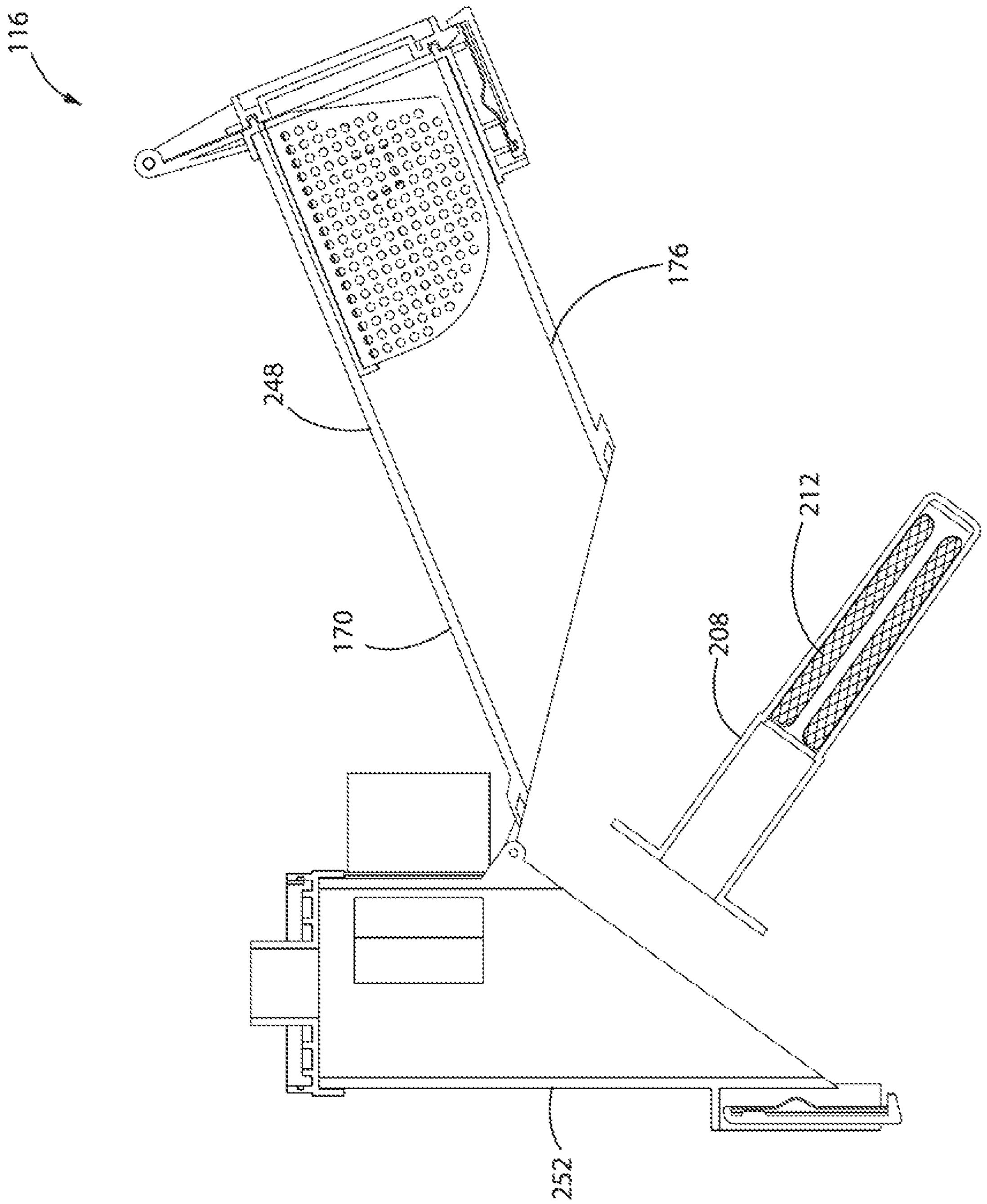
FIG. 12 is a cross-sectional view of the air treatment member of FIG. 10, in an open position, with a cyclone outlet passage removed in accordance with an embodiment.

FIG. 12 exemplifies an alternate embodiment wherein cyclone outlet passage 208, including screen 212, is removable from cyclone 170 after sidewall first portion 248 is moved to the open position. This can allow cyclone outlet passage 208 to be most easily cleaned, and optionally replaced if it is a consumable item or damaged.

Figure 13:
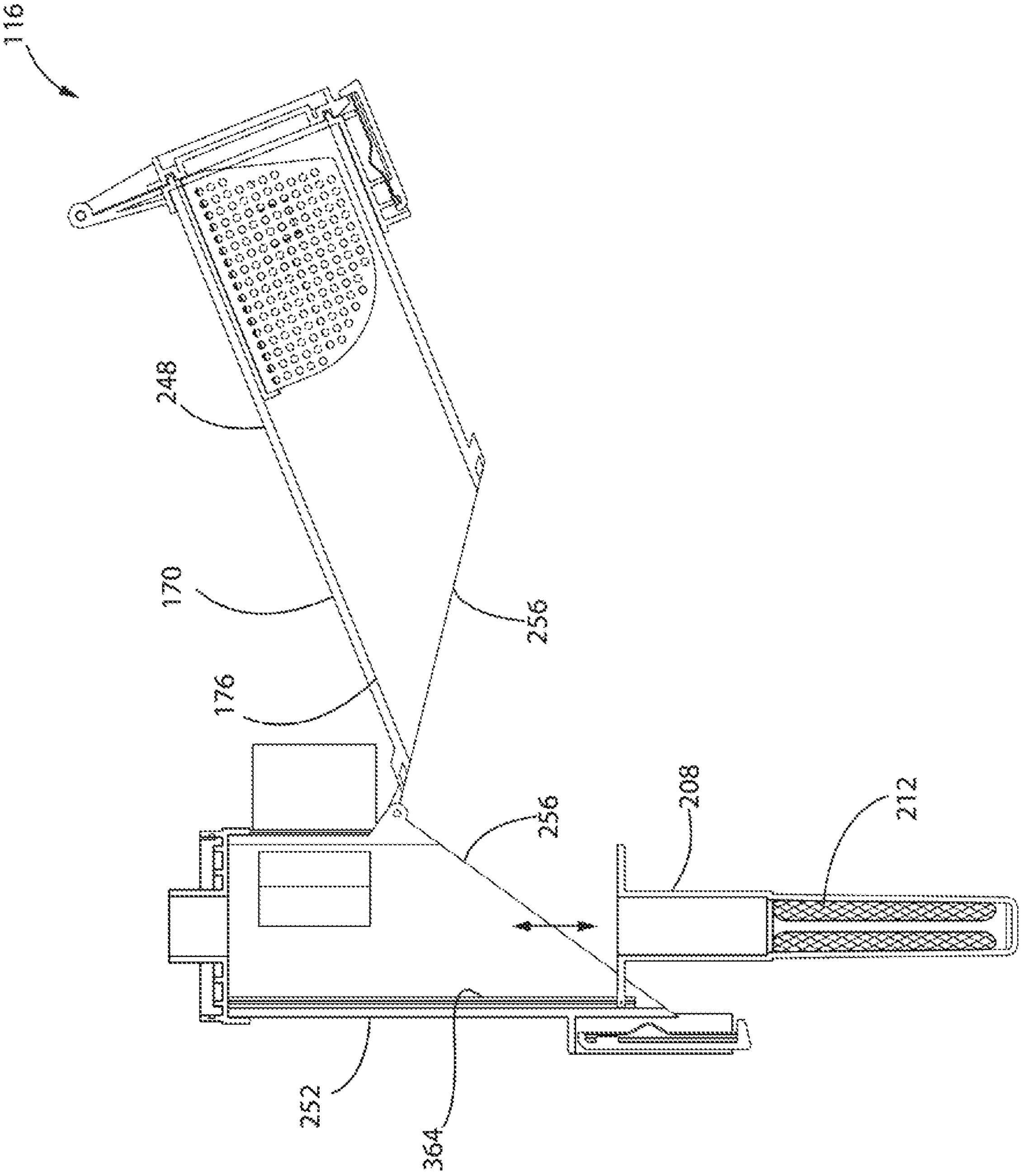
FIG. 13 is a cross-sectional view of the air treatment member of FIG. 10, in an open position, with the cyclone outlet passage translated in accordance with an embodiment.

FIG. 13 exemplifies an embodiment in which cyclone outlet passage 208, including screen 212, is translatable relative to sidewall portions 248, 252. As shown, cyclone outlet passage 208 may be translatably connected to one of the sidewall portions, e.g., sidewall portion 252, whereby cyclone outlet passage 208 can move along track 364 through cyclone chamber opening 256. This moves screen 212 out of cyclone chamber 176 so that it can be easily cleaned of dirt and debris by the user.

Figure 15:
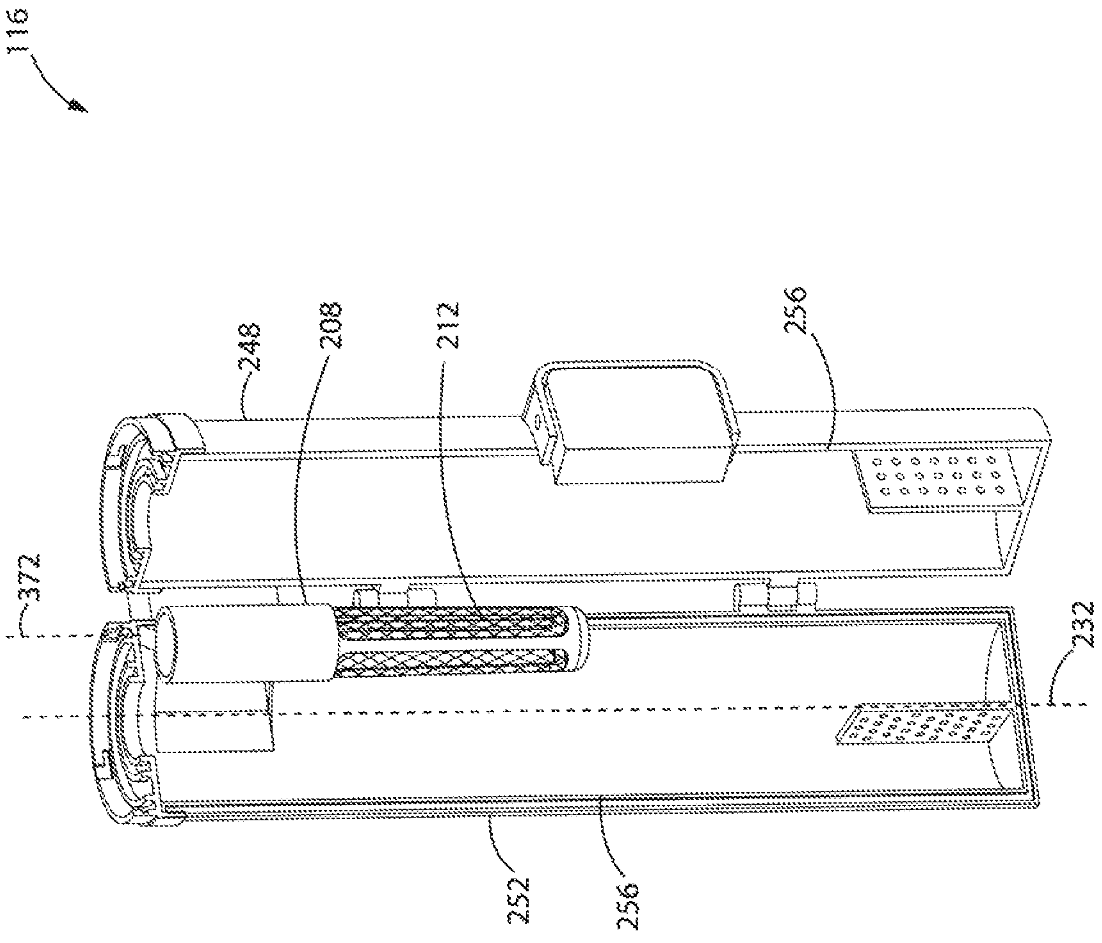
FIG. 15 is a perspective view of an air treatment member in an open position and with the cyclone outlet passage rotated out of a cyclone chamber, in accordance with an embodiment.
Figure 16:
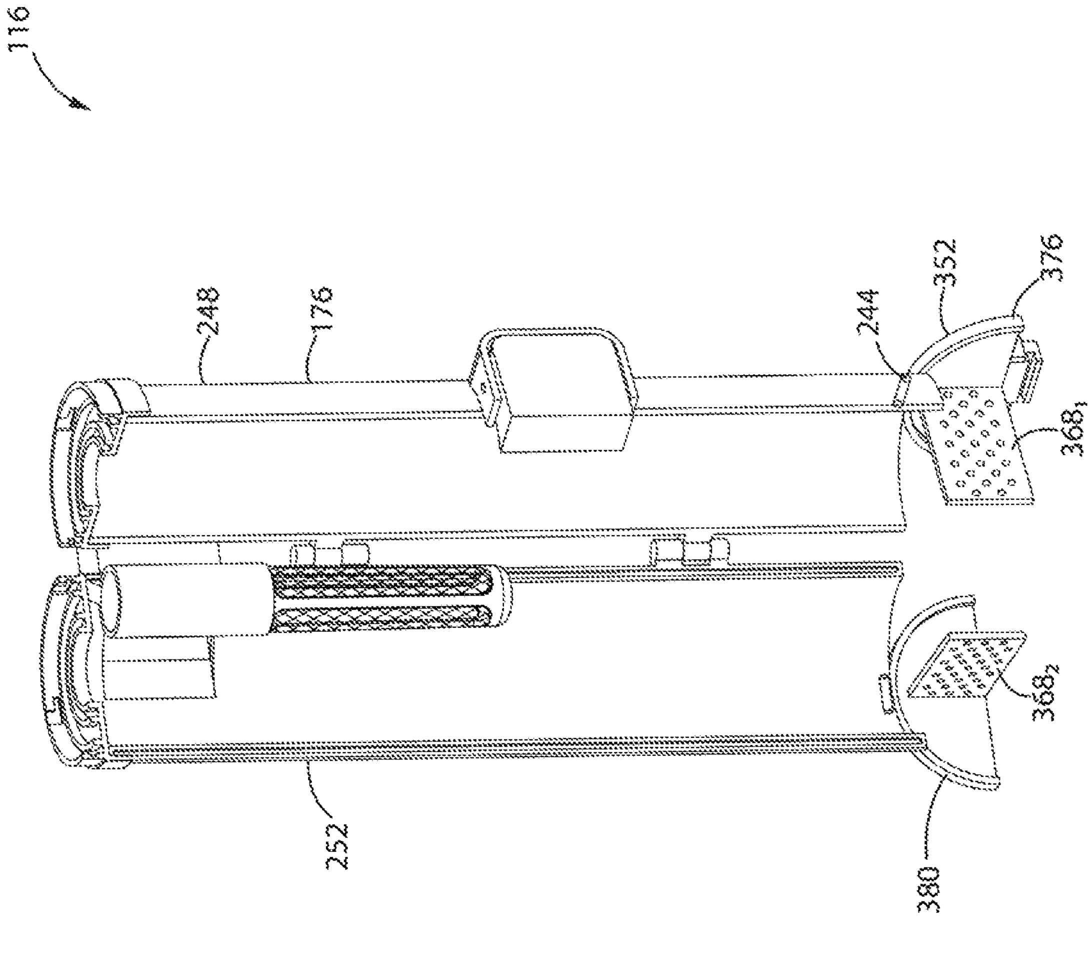
FIG. 16 is a perspective view of an air treatment member in an open position with the cyclone outlet passage rotated out of the cyclone chamber and an open end door in accordance with an embodiment.
Figure 26:
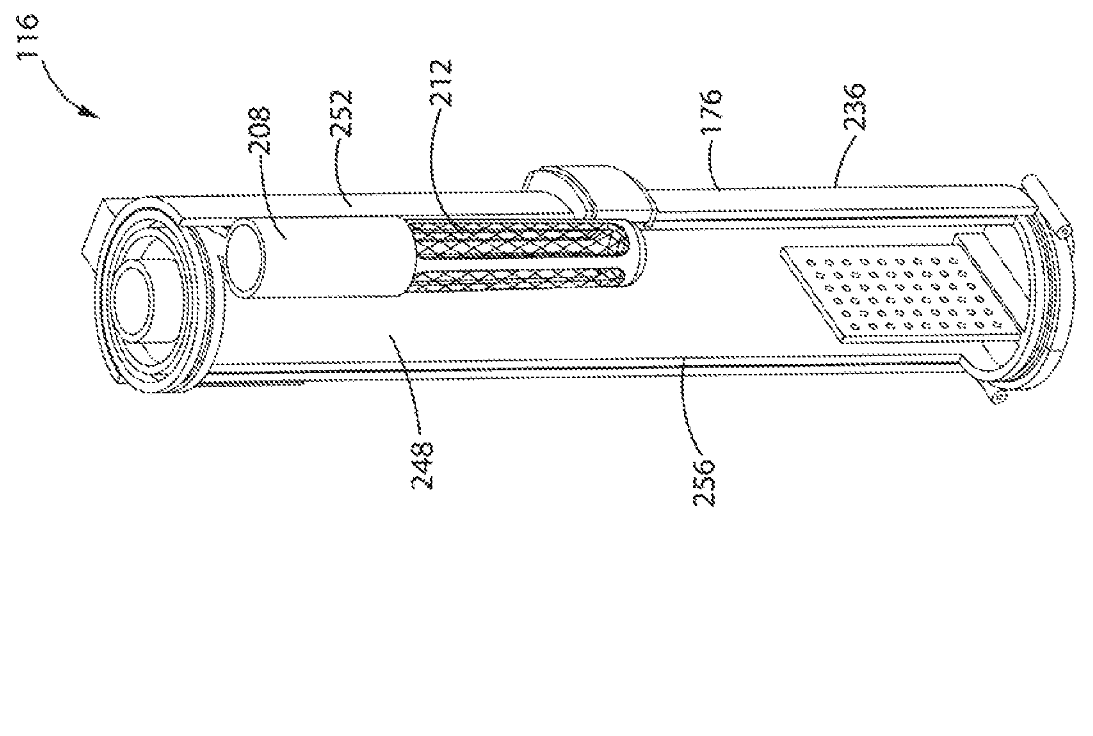
FIG. 26 is a perspective view of the air treatment member of FIG. 25 in the open position with the cyclone outlet passage rotated out of the cyclone chamber.

As exemplified in FIGS. 14-16, cyclone outlet passage 208 (including screen 212) may be pivotable about an axial screen rotation axis 372. As shown, this design allows cyclone outlet passage 208 to be rotated out of the cyclone chamber to provide easy user-access to surfaces of screen 212 for cleaning. In this example, screen rotation axis 372 is shown as parallel to cyclone axis 232. In other embodiments, screen rotation axis 372 may be oriented at a (non-zero) angle to cyclone axis 232. A similar design is useable in the embodiment of FIG. 26.

Dual End Walls

Embodiments herein relate to a cyclone chamber wherein the end wall comprises two or more end wall segments, one or more of which, and optionally, each of which, is openable. This feature may be used by itself in any surface cleaning apparatus or in any combination or sub-combination with any other feature or features described herein.

An advantage of this design is that each openable sidewall portion may have part of the end wall 244. This can facilitate sealing the cyclone chamber when the sidewall portions are in the closed position.

As exemplified in FIG. 14, half of the end wall 244 may be fixedly mounted to each sidewall portion 248, 252.

Figure 17:
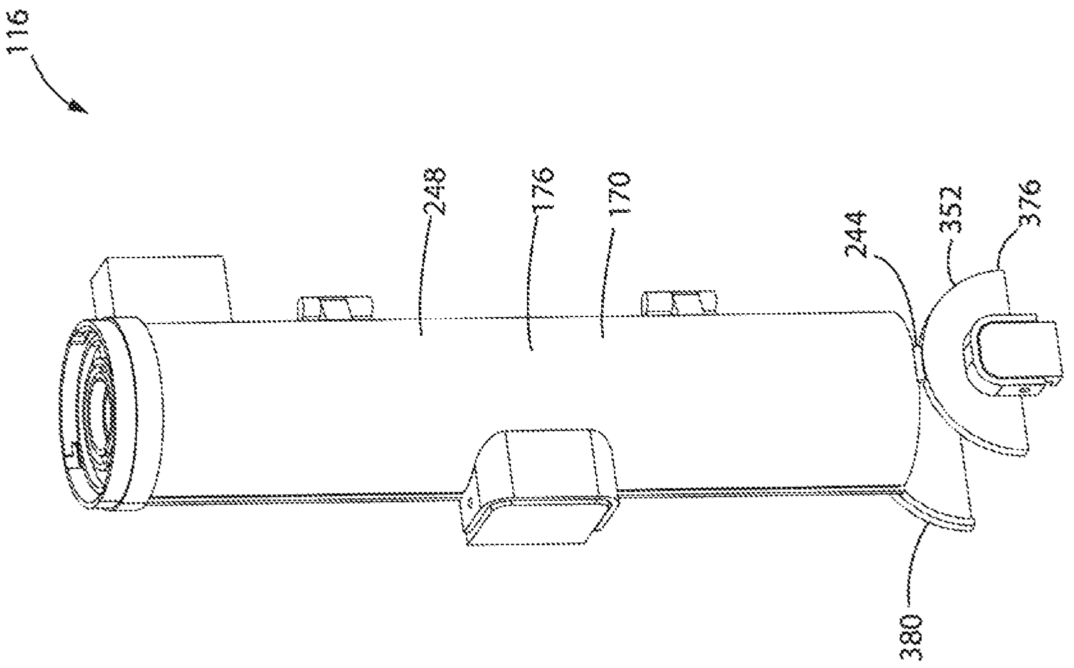
FIG. 17 is a perspective view of the air treatment member of FIG. 16 with a closed sidewall and an open end door in accordance with an embodiment.

Alternately, as exemplified in FIGS. 16-17, each end wall portion may be openable. As exemplified therein, cyclone chamber 176 may include an openable end wall 352 at chamber second end 244. As shown, openable end wall 352 may include a first wall portion 376 movably (e.g. pivotably) connected to sidewall first portion 248 and a second wall portion 380 movably (e.g. pivotably) connected to sidewall second portion 252 as shown. An advantage of this design is that upon opening end wall 352 to empty dirt and debris from cyclone chamber 176 into a waste bin below, the end wall portions 376, 380 may tend to funnel the falling dirt and debris into a waste bin below. This may mitigate the dirt and debris spilling laterally outside of the waste bin upon opening end wall 352.

Figure 18:
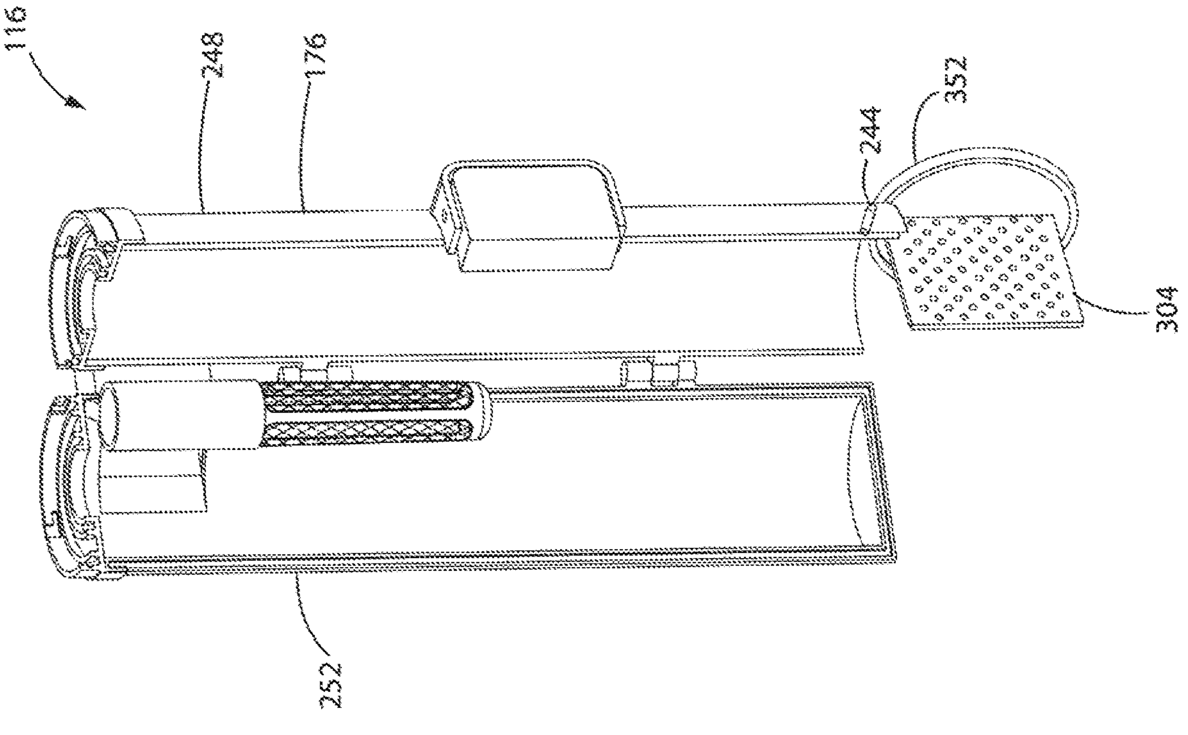
FIG. 18 is a perspective view of an air treatment member in an open position with an open end door in accordance with an embodiment.

FIGS. 19-21 exemplify the use of two end wall segments in a rotational opening design. As shown, in the open position (FIG. 20), end wall portion 376 may overlie end wall portion 380. As compared with an end wall 352 that remains whole (e.g. if the design of end wall 352 of FIG. 18 were used and end wall 352 was mounted in a fixed position to a sidewall portion), this design may reduce the effective surface area of end wall 352 in the open position so that dirt and debris can fall out of cyclone chamber 176 more easily. Furthermore, this design may make cleaning cyclone chamber 176 easier in that the act of moving wall second portion 380 under wall first portion 376 may automatically push dirt and debris collected on wall second portion 380 out of cyclone chamber 176.

Figure 24:
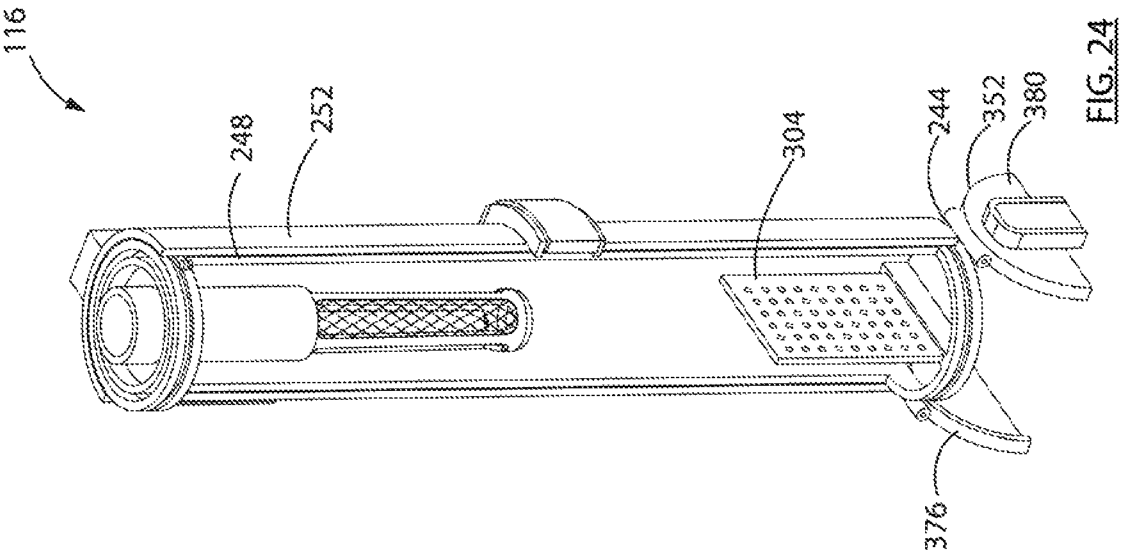
FIG. 24 is a perspective view of the air treatment member of FIG. 22 in the open position and with open end doors.

FIG. 24 exemplifies the use of two end wall segments in a rotational opening design wherein door portions 376, 380 are separately openable.

Vertical Screen

Embodiments herein relate to vertical screen. This feature may be used by itself in any surface cleaning apparatus or in any combination or sub-combination with any other feature or features described herein.

In accordance with this aspect, a cyclone chamber is provided with an axially extending member which may be planar and which may be porous (e.g., it may have a plurality of openings therein). Axially extending member 304 may be provided in the cyclone chamber 176 (e.g. the dirt collection region 172 of the cyclone chamber 176) at chamber second end 244.

Axially extending member 304 may help to disentrain dirt and debris from the air flow. Alternatively or in addition, axially extending member 304 may help to prevent dirt and debris being re-entrained into the air flow inside the cyclone chamber 176 (e.g. inside the dirt collection region 172 of the cyclone chamber 176). Axially extending member 304 can have any configuration suitable for providing one or both of these functions. For example, axially extending member 304 may include a coarse or fine screen, an apertured panel, or high air permeability physical filter media that can allow the air flow to continue circulating while providing some obstruction to dirt and debris and/or providing collecting surfaces for dirt and debris.

An example of such a design is shown in FIGS. 5-6 wherein a single axially extending member 304 is located at chamber second end 244.

In the illustrated example, axially extending member 304 is formed as a thin panel (e.g. plate) with a plurality of small apertures 306. For example, axially extending member 304 may include at least 50 apertures, such as for example 50 to 5,000 apertures. Axially extending member 304 has an axial height 308 and transverse width 312, each of which is far greater than its thickness 316. An advantage of this design is that it provides axially extending member 304 with a large surface area (defined by height 308 and width 312) for obstructing and/or collecting dirt and debris, and a small volume so as to occupy only a small portion of cyclone chamber 176. For example, each of height 308 and width 312 may be at least 500% (e.g. 500% to 100,000%) of thickness 316. As shown, height 308 may be 25% or more of cyclone chamber height 320 (e.g. 25% to 75% of cyclone chamber height 320), and width 312 may be 25% or more of cyclone chamber width 324 (FIG. 1, e.g. 25% to 100% of cyclone chamber width 312). In the illustrated example, height 308 is approximately 50% of cyclone chamber height 320, and width 324 is approximately 100% of cyclone chamber width 312.

Axially extending member 304 may be connected to one or more of the sidewall portions. As exemplified in FIGS. 5-6, axially extending member 304 may remain connected to the sidewall portion that does not have the end wall 244 attached thereto. Therefore, as exemplified, axially extending member 304 remains connected to sidewall second portion 252 when sidewall first portion 248 is moved to the open position. This allows dirt and debris that falls by gravity from axially extending member 304 (naturally or by the user brushing axially extending member 304) to fall out of cyclone chamber 176 without interference by cyclone second end wall 244, which in this example remains connected to sidewall first portion 248.

Figure 7:
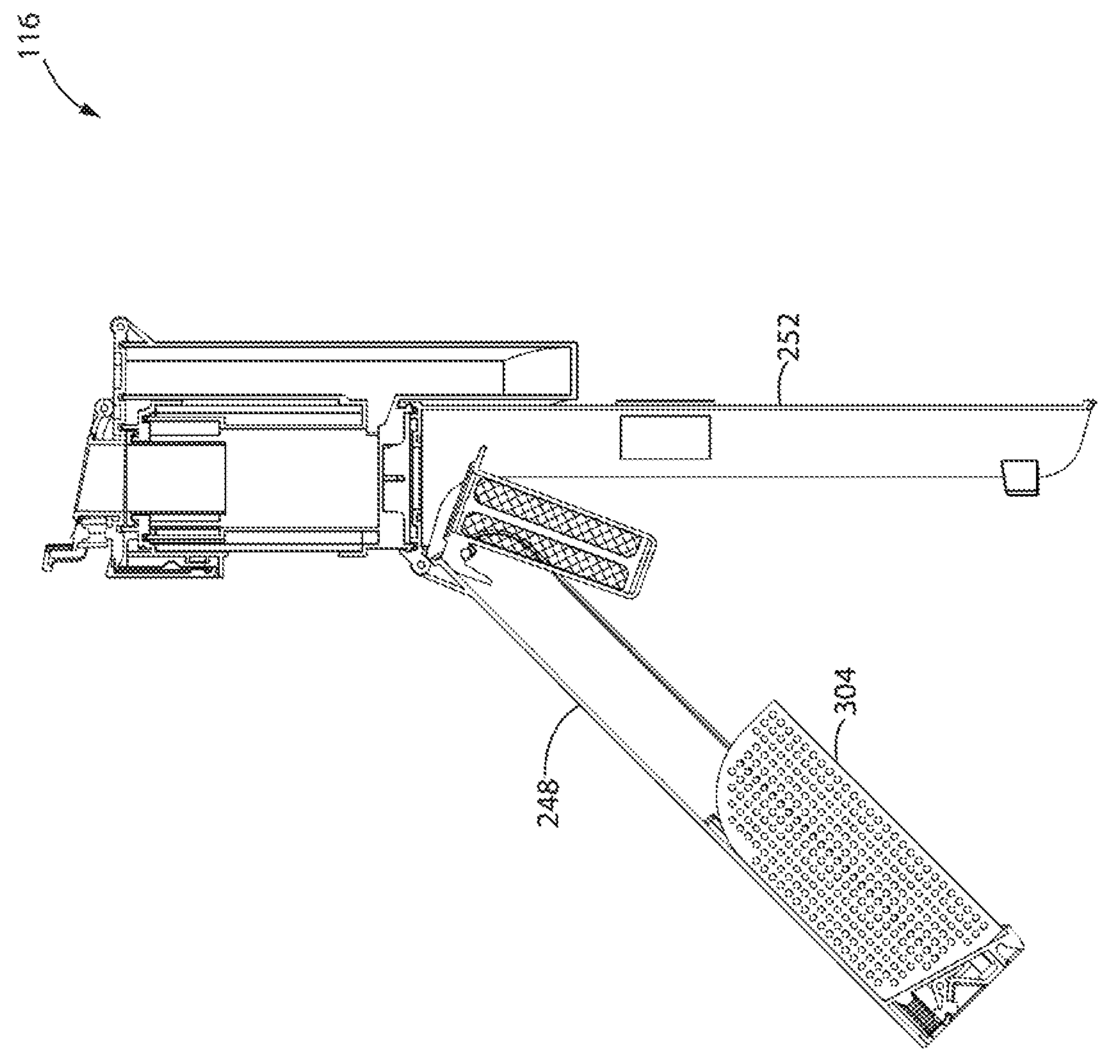
FIG. 7 is a cross-sectional view taken along line 6-6 in FIG. 5, in accordance with another embodiment.

FIG. 7 shows an alternative embodiment in which axially extending member 304 remains connected to sidewall first portion 248 (the sidewall portion with end wall 244 attached thereto) when sidewall first portion 248 moves to the open position.

Axially extending member may be fixedly mounted to a sidewall portion or it may be moveably mounted thereto. Alternately, axially extending member 304 may be movable (e.g. pivotably, translatably, and/or removably) connected to one or more sidewall portions. This can allow surfaces of axially extending member 304 to move away from sidewall portion(s) 248, 252 where there is greater clearance and therefore better access for the user to clean those surfaces.

Figure 8:
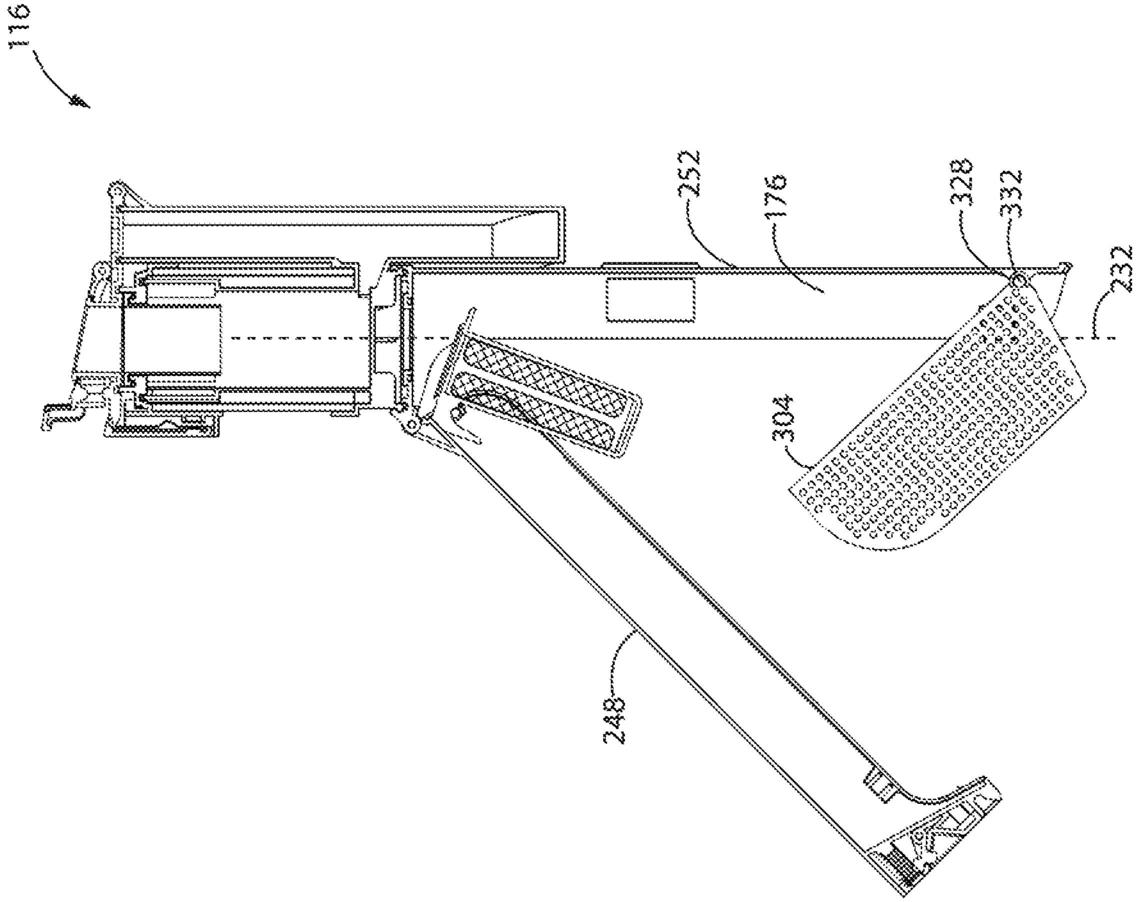
FIG. 8 is a cross-sectional view taken along line 6-6 in FIG. 5, in accordance with another embodiment.
Figure 9:
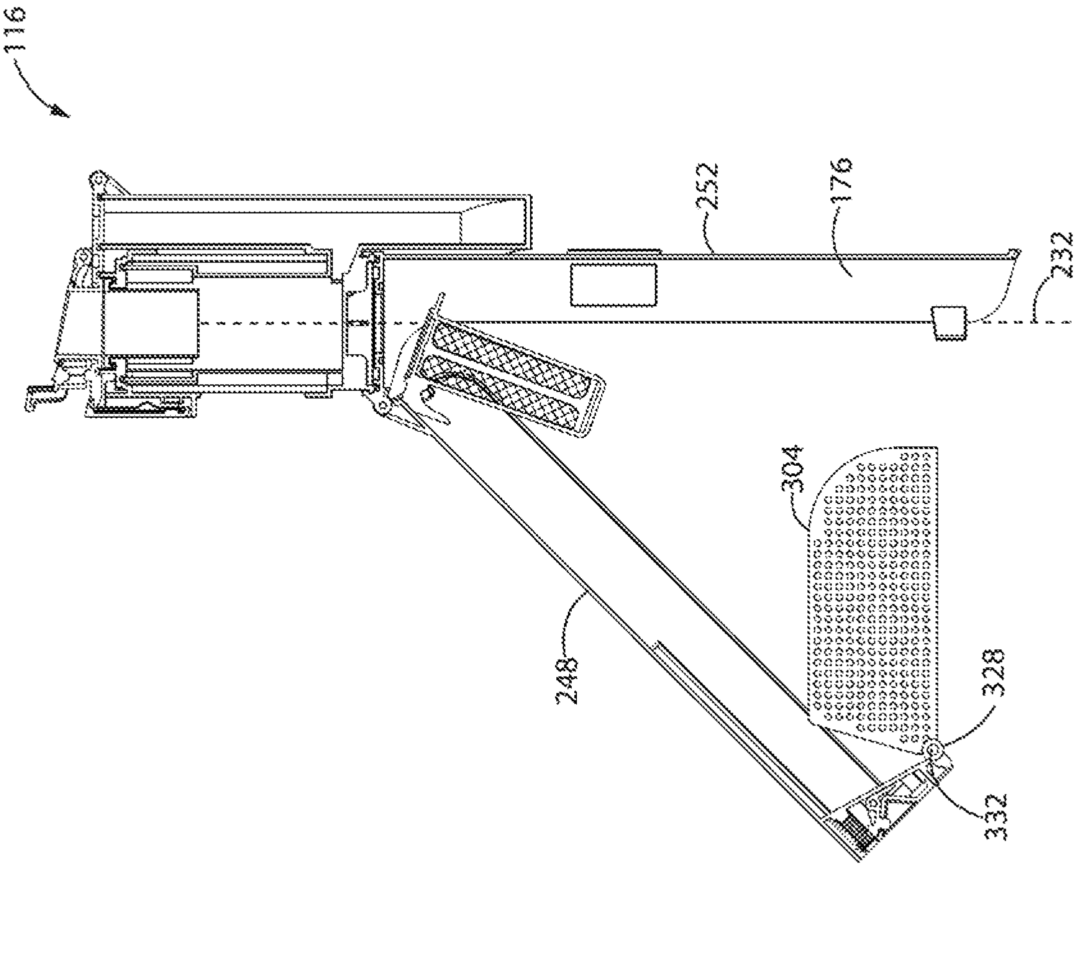
FIG. 9 is a cross-sectional view taken along line 6-6 in FIG. 5, in accordance with another embodiment.

As exemplified in FIGS. 8-9 axially extending member 304 is pivotably connected to a sidewall portion 248, 252. In FIG. 8, axially extending member 304 is pivotably connected to the sidewall portion that remains in position and In FIG. 9, axially extending member 304 is pivotably connected to the sidewall portion that moves to the open position. The pivoting connection may be formed by a hinge 328 that defines a rotation axis 332. As shown, rotation axis 332 may extend through cyclone chamber 176. In the example shown, rotation axis 332 is transverse to (e.g. perpendicular to) cyclone axis 232. FIG. 21 also exemplifies an embodiment wherein axially extending member 304 may be pivoted about rotation axis 332 away from sidewall first portion 248.

If the cyclone has more than one end wall portion, then it will be appreciated that two or more of the sidewall portions may be provided with an axially extending member 304. Accordingly, axially extending member 304 may include first and second separable parts, whereby in the open position, the first part remains connected to one sidewall portion and the second part remains connected to another sidewall portion. An example of such a design is shown in FIG. 14. As exemplified therein, axially extending member 304 has two separable parts $\mathbf{368_1}$ and $\mathbf{368_2}$. In the open position, part $\mathbf{368_1}$ remains connected to sidewall first portion 248 (e.g. portion 376 of movable end wall 352), and part $\mathbf{368_2}$ remains connected to sidewall second portion 252 (e.g., portion 380 of movable end wall 352).

Figure 23:
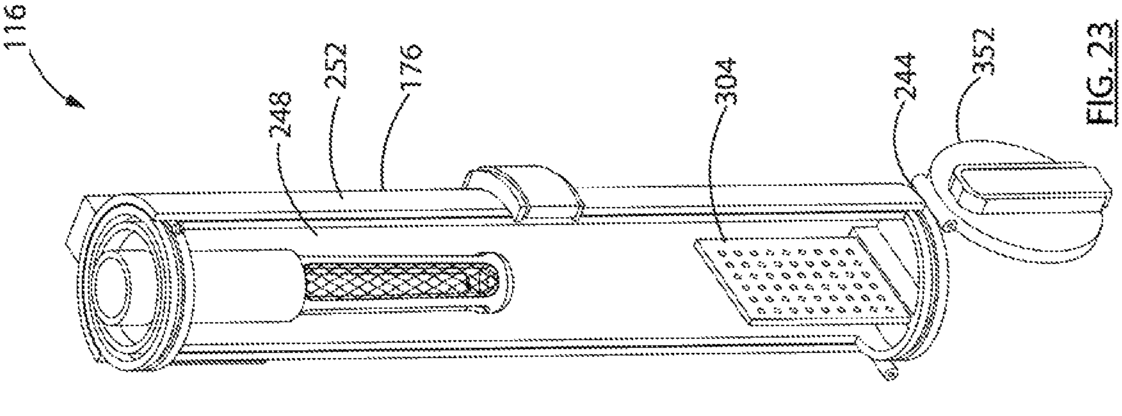
FIG. 23 is a perspective view of an air treatment member in an open position and with an open end door in accordance with an embodiment.
Figure 25:
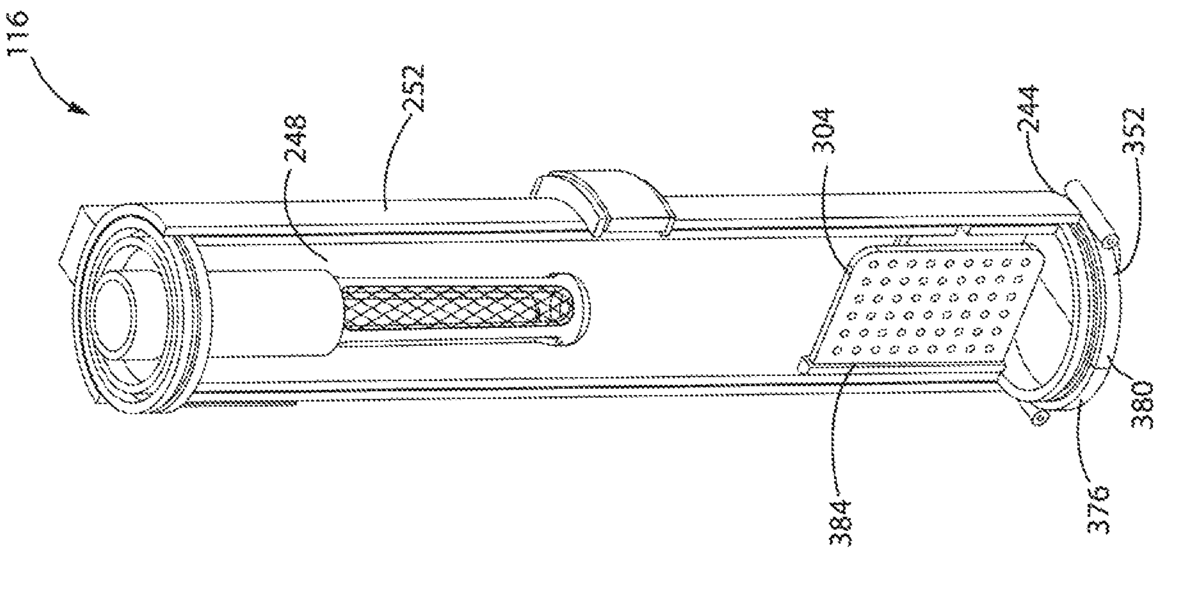
FIG. 25 is a perspective view of an air treatment member in an open position in accordance with an embodiment.

It will be appreciated that while axially extending member 304 may be mounted to, and moveable with part or all of end wall 352, 276, 280 (see for example FIG. 32), in alternate embodiments, axially extending member 304 may remain in the cyclone chamber when part or all of end wall 352, 376, 380 is moved to an open position (see for example FIGS. 23-24).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A vacuum cleaner comprising:

(a) an air flow path extending from a dirty air inlet to a clean air outlet;

(b) a cyclone bin assembly provided in the air flow path, the cyclone bin assembly comprising a cyclone chamber, a cyclone air inlet, a cyclone air outlet, a cyclone axis of rotation, an axially extending cyclone chamber sidewall extending between first and second axially opposed ends; and, (c) a suction motor provided in the air flow path, wherein the cyclone chamber sidewall has a first portion that is moveably mounted with respect to a second portion of the cyclone chamber sidewall between a closed position in which the first and second portions meet at a first juncture and a second juncture and an open position in which the cyclone chamber is opened and, in a plane that is transverse to the cyclone axis of rotation, the first portion comprises an arc shaped portion that extends between the first and second junctures, and wherein the first juncture extends at a non-zero angle to the plane that is transverse to the cyclone axis of rotation.

2. The vacuum cleaner of claim 1 wherein the first juncture extends generally axially.

3. The vacuum cleaner of claim 1 wherein the first portion is pivotally mounted to vacuum cleaner about a pivot axis and the pivot axis extends through the cyclone chamber.

4. The vacuum cleaner of claim 1 wherein the cyclone air outlet is provided at the first opposed end and the second opposed end comprises an end wall that is moveable with the first portion.

5. The vacuum cleaner of claim 1 wherein the cyclone air outlet comprises a screen and the screen is moveably mounted with respect to one of the sidewall portions.

6. The vacuum cleaner of claim 5 wherein the screen is pivotally mounted to one of the sidewall portions.

7. The vacuum cleaner of claim 5 wherein the screen is removable after the first portion is moved to the open position.

8. The vacuum cleaner of claim 1, wherein the cyclone air outlet is provided at the first opposed end, the cyclone air outlet comprises a screen, the second opposed end comprises an end wall and the vacuum cleaner further comprises a generally axially extending member provided in the cyclone chamber at the opposed end.

9. The vacuum cleaner of claim 1 wherein the cyclone air outlet is provided at the first opposed end and the second opposed end comprises an end wall that is moveable mounted with respect to the first and second portions.

10. The vacuum cleaner of claim 9 wherein the end wall is pivotally mounted to one of the first and second portions.

11. The vacuum cleaner of claim 1 wherein the first portion is pivotally mounted to the vacuum cleaner about a pivot axis and the pivot axis extends generally axially.

12. The vacuum cleaner of claim 11 wherein the pivot axis is positioned external to the cyclone chamber.

13. The vacuum cleaner of claim 11 wherein the pivot axis comprises a piano hinge.

14. The vacuum cleaner of claim 11 wherein the pivot axis is aligned with the cyclone axis of rotation.

15. The vacuum cleaner of claim 11 wherein the pivot axis extends through the cyclone chamber and each of the first and second portions comprises an axial cylindrical segment.

16. The vacuum cleaner of claim 15 wherein the first juncture extends generally axially.

17. The vacuum cleaner of claim 2 wherein the second juncture that extends generally parallel to the first juncture and is angularly spaced around the cyclone chamber from the first juncture, whereby the first portion is axially translatable with respect to the second portion.

18. A vacuum cleaner comprising:

(a) an air flow path extending from a dirty air inlet to a clean air outlet;

(b) a cyclone bin assembly provided in the air flow path, the cyclone bin assembly comprising a cyclone chamber, a cyclone air inlet, a cyclone air outlet, a cyclone axis of rotation, an axially extending cyclone chamber sidewall extending between first and second axially opposed ends; and, (c) a suction motor provided in the air flow path, wherein the cyclone chamber sidewall has a first axially extending portion that is moveably mounted with respect to a second axially portion of the cyclone chamber sidewall between a closed position in which the first and second portions abut and an open position in which the cyclone chamber is opened and, in a plane that is transverse to the cyclone axis of rotation, the first portion comprises an arc shaped portion that extends between the first and second junctures.

19. The vacuum cleaner of claim 18 wherein the first axially extending portion of the sidewall is pivotally mounted to the vacuum cleaner about a pivot axis and the pivot axis is generally transverse to the cyclone axis of rotation.

20. The vacuum cleaner of claim 19 wherein the cyclone air outlet is provided at the first opposed end, the pivot axis is provided at the first opposed end, the cyclone air outlet comprises a screen and the screen is moveably mounted with respect to the second axially extending portion of the sidewall.

* * * * *